(12) United States Patent
Jiang

(10) Patent No.: US 8,175,622 B2
(45) Date of Patent: May 8, 2012

(54) METHOD AND SYSTEM FOR KEEPING ALL PHONE NUMBERS ACTIVE WHILE ROAMING WITH DIVERSE OPERATOR SUBSCRIBER IDENTITY MODULES

(75) Inventor: John Yue Jun Jiang, Danville, CA (US)

(73) Assignee: Roamware, Inc., San Jose, CA (US)

( * ) Notice: Subject to any disclaimer, the term of this patent is extended or adjusted under 35 U.S.C. 154(b) by 394 days.

(21) Appl. No.: 11/700,964

(22) Filed: Feb. 1, 2007

(65) Prior Publication Data

US 2007/0213050 A1    Sep. 13, 2007

Related U.S. Application Data

(63) Continuation-in-part of application No. 11/699,505, filed on Jan. 30, 2007, and a continuation-in-part of application No. 10/782,681, filed on Feb. 18, 2004, and a continuation-in-part of application No. 10/918,645, filed on Aug. 13, 2004, and a continuation-in-part of application No. 10/778,861, filed on Feb. 13, 2004.

(60) Provisional application No. 60/762,893, filed on Jan. 30, 2006, provisional application No. 60/447,998, filed on Feb. 18, 2003, provisional application No. 60/495,202, filed on Aug. 13, 2003, provisional application No. 60/447,533, filed on Feb. 14, 2003.

(51) Int. Cl.
*H04W 4/00* (2009.01)

(52) U.S. Cl. .................. 455/461; 455/432.1; 455/432.2; 455/432.3; 455/412.1

(58) Field of Classification Search .................. 455/418, 455/432–435, 405, 412, 459, 432.1, 445, 455/461

See application file for complete search history.

(56) References Cited

U.S. PATENT DOCUMENTS 5,353,328 A    10/1994    Jokimies (Continued)

FOREIGN PATENT DOCUMENTS

AU    199940379    1/2000

(Continued)

OTHER PUBLICATIONS

Digital cellular telecommunications system (Phase 2+); Specification of the SIM Application Toolkit for the Subscriber Identity Module-Mobile Equipment (SIM-ME) Interface (GSM 11,14 version 8.3.0 Release 1999) STSI TS 101 267 V8.3.0, XX, XX, XX, Aug. 2000, pp. 1-69 and pp. 114-115 (XP-002222021), Aug. 2000.

(Continued)

*Primary Examiner* — Jean Gelin
*Assistant Examiner* — Nathan Taylor
(74) *Attorney, Agent, or Firm* — Arent Fox, LLP

(57) ABSTRACT

A system, method, and computer product are provided for facilitating mobile communication corresponding to Multiple MSISDNs associated with Multiple IMSIs of a subscriber. The system includes a Signaling Gateway (SG) coupled to a first network. The SG receives one or more association messages from a subscriber for associating a first IMSI, corresponding to the first network, with one or more other IMSIs, corresponding to one or more VPMN networks. The first and other IMSIs are associated with the subscriber using at least one SIM. The SG associates MSISDNs corresponding to the associated IMSIs. Further, the SG facilitates mobile communication corresponding to any associated IMSI and the corresponding associated MSISDN, irrespective of the IMSI being activated in the SIM.

24 Claims, 27 Drawing Sheets

U.S. PATENT DOCUMENTS

| | | | | |
|---|---|---|---|---|
| 5,586,166 | A | 12/1996 | Turban | |
| 5,742,910 | A | 4/1998 | Gallant et al. | |
| 5,764,730 | A | 6/1998 | Rabe et al. | |
| 5,818,824 | A | 10/1998 | Lu et al. | |
| 5,854,982 | A | 12/1998 | Chambers et al. | |
| 5,901,359 | A | 5/1999 | Malmstrom | |
| 5,903,832 | A | 5/1999 | Seppanen et al. | |
| 5,924,035 | A | 7/1999 | Joensuu | |
| 5,930,701 | A | 7/1999 | Skog | |
| 5,940,490 | A | 8/1999 | Foster et al. | |
| 5,943,620 | A | 8/1999 | Boltz et al. | |
| 5,953,653 | A | 9/1999 | Josenhans et al. | |
| 5,987,318 | A | 11/1999 | Alperovich et al. | |
| 5,987,323 | A | 11/1999 | Huotori | |
| 5,987,325 | A | 11/1999 | Tayloe | |
| 6,014,561 | A * | 1/2000 | Molne | 455/419 |
| 6,052,604 | A | 4/2000 | Bishop et al. | |
| 6,058,309 | A | 5/2000 | Huang et al. | |
| 6,075,855 | A | 6/2000 | Christiansen et al. | |
| 6,085,084 | A | 7/2000 | Christmas | |
| 6,138,005 | A | 10/2000 | Park | |
| 6,138,009 | A | 10/2000 | Birgerson | |
| 6,148,197 | A | 11/2000 | Bridges et al. | |
| 6,163,701 | A | 12/2000 | Saleh et al. | |
| 6,185,295 | B1 | 2/2001 | Frederiksen et al. | |
| 6,185,436 | B1 | 2/2001 | Vu | |
| 6,192,255 | B1 | 2/2001 | Lewis et al. | |
| 6,195,532 | B1 | 2/2001 | Bamburak et al. | |
| 6,208,864 | B1 | 3/2001 | Agrawal et al. | |
| 6,212,372 | B1 | 4/2001 | Julin | |
| 6,356,755 | B1 | 3/2002 | Valentine et al. | |
| 6,356,756 | B1 | 3/2002 | Koster | |
| 6,456,845 | B1 | 9/2002 | Drum et al. | |
| 6,456,859 | B1 | 9/2002 | Desblancs et al. | |
| 6,463,298 | B1 | 10/2002 | Sorenson et al. | |
| 6,466,786 | B1 | 10/2002 | Wallenius | |
| 6,505,050 | B1 | 1/2003 | Brudos et al. | |
| 6,515,974 | B1 | 2/2003 | Inoue et al. | |
| 6,574,481 | B1 | 6/2003 | Rathnasabapathy et al. | |
| 6,603,761 | B1 | 8/2003 | Wang et al. | |
| 6,603,968 | B2 * | 8/2003 | Anvekar et al. | 455/433 |
| 6,611,516 | B1 | 8/2003 | Pirkola et al. | |
| 6,628,934 | B2 | 9/2003 | Rosenberg et al. | |
| 6,636,502 | B1 | 10/2003 | Lager et al. | |
| 6,671,523 | B1 * | 12/2003 | Niepel et al. | 455/558 |
| 6,684,073 | B1 * | 1/2004 | Joss et al. | 455/433 |
| 6,693,586 | B1 | 2/2004 | Walters et al. | |
| 6,738,622 | B1 | 5/2004 | Stadelmann et al. | |
| 6,738,636 | B2 | 5/2004 | Lielbridis | |
| 6,764,003 | B1 | 7/2004 | Martshitsch et al. | |
| 6,782,264 | B2 | 8/2004 | Anderson | |
| 6,795,444 | B1 | 9/2004 | Vo et al. | |
| 6,856,818 | B1 | 2/2005 | Ford | |
| 6,876,860 | B1 * | 4/2005 | Berg et al. | 455/459 |
| 6,920,487 | B2 | 7/2005 | Sofer et al. | |
| 6,925,299 | B1 | 8/2005 | Sofer et al. | |
| 6,961,559 | B1 | 11/2005 | Chow et al. | |
| 6,963,543 | B2 | 11/2005 | Diep et al. | |
| 6,968,383 | B1 | 11/2005 | Heutschi et al. | |
| 6,975,852 | B1 | 12/2005 | Sofer et al. | |
| 6,978,156 | B1 | 12/2005 | Papadopoulos et al. | |
| 7,020,479 | B2 | 3/2006 | Martschitsch | |
| 7,031,704 | B2 * | 4/2006 | Di Claudio et al. | 455/432.1 |
| 7,139,570 | B2 | 11/2006 | Elkarat et al. | |
| 7,184,764 | B2 | 2/2007 | Raviv et al. | |
| 7,231,431 | B2 | 6/2007 | Sofer et al. | |
| 7,372,860 | B1 * | 5/2008 | Haumont | 370/401 |
| 2002/0009199 | A1 | 1/2002 | Ala-Laurila et al. | |
| 2002/0012351 | A1 | 1/2002 | Sofer et al. | |
| 2002/0037708 | A1 | 3/2002 | McCann et al. | |
| 2002/0061745 | A1 * | 5/2002 | Ahn et al. | 455/432 |
| 2002/0087631 | A1 | 7/2002 | Sharma | |
| 2002/0101858 | A1 | 8/2002 | Stuart et al. | |
| 2002/0101859 | A1 | 8/2002 | Maclean | |
| 2002/0160763 | A1 | 10/2002 | Mittal et al. | |
| 2002/0187780 | A1 | 12/2002 | Souissi | |
| 2002/0191575 | A1 | 12/2002 | Kalavade et al. | |
| 2002/0196775 | A1 | 12/2002 | Tuohino et al. | |
| 2002/0197991 | A1 | 12/2002 | Anvekar et al. | |
| 2003/0017843 | A1 | 1/2003 | Noblins | |
| 2003/0050047 | A1 * | 3/2003 | Ala-Luukko | 455/412 |
| 2003/0051041 | A1 | 3/2003 | Kalavade et al. | |
| 2003/0064723 | A1 * | 4/2003 | Thakker | 455/432 |
| 2003/0069922 | A1 | 4/2003 | Arunachalam | |
| 2003/0129991 | A1 * | 7/2003 | Allison et al. | 455/456 |
| 2003/0133421 | A1 | 7/2003 | Sundar et al. | |
| 2003/0139180 | A1 | 7/2003 | McIntosh et al. | |
| 2003/0157938 | A1 * | 8/2003 | Haase et al. | 455/445 |
| 2003/0165135 | A1 | 9/2003 | Itzkovitz et al. | |
| 2003/0208560 | A1 | 11/2003 | Inoue | |
| 2003/0224795 | A1 | 12/2003 | Wilhoite et al. | |
| 2003/0229791 | A1 | 12/2003 | De Jong | |
| 2004/0019539 | A1 | 1/2004 | Raman et al. | |
| 2004/0053610 | A1 | 3/2004 | Kim | |
| 2004/0082346 | A1 | 4/2004 | Skytt et al. | |
| 2004/0087305 | A1 | 5/2004 | Jiang | |
| 2004/0120552 | A1 | 6/2004 | Borngraber et al. | |
| 2004/0131023 | A1 | 7/2004 | Auterinen | |
| 2004/0132449 | A1 | 7/2004 | Kowarch | |
| 2004/0148400 | A1 | 7/2004 | Mostafa | |
| 2004/0196858 | A1 | 10/2004 | Tsai et al. | |
| 2004/0224680 | A1 | 11/2004 | Jiang | |
| 2004/0229601 | A1 * | 11/2004 | Zabawskyj et al. | 455/417 |
| 2004/0236836 | A1 | 11/2004 | Appleman | |
| 2005/0021834 | A1 | 1/2005 | Coulombe | |
| 2005/0047378 | A1 | 3/2005 | Wuschke et al. | |
| 2005/0064883 | A1 | 3/2005 | Heck et al. | |
| 2005/0070278 | A1 | 3/2005 | Jiang | |
| 2005/0130654 | A1 * | 6/2005 | Di Claudio et al. | 455/433 |
| 2005/0186939 | A1 | 8/2005 | Barnea et al. | |
| 2005/0186960 | A1 | 8/2005 | Jiang | |
| 2005/0186979 | A1 | 8/2005 | McCann et al. | |
| 2005/0192007 | A1 | 9/2005 | Kumar et al. | |
| 2005/0192035 | A1 | 9/2005 | Jiang | |
| 2005/0215250 | A1 | 9/2005 | Chava et al. | |
| 2005/0232282 | A1 | 10/2005 | Silver et al. | |
| 2005/0250493 | A1 | 11/2005 | Elkarat et al. | |
| 2006/0003775 | A1 | 1/2006 | Bull et al. | |
| 2006/0009204 | A1 | 1/2006 | Ophir | |
| 2006/0025129 | A1 | 2/2006 | Wolfman et al. | |
| 2006/0052113 | A1 | 3/2006 | Ophir et al. | |
| 2006/0068778 | A1 | 3/2006 | Della-Torre | |
| 2006/0068786 | A1 | 3/2006 | Florence | |
| 2006/0079225 | A1 | 4/2006 | Wolfman et al. | |
| 2006/0079236 | A1 | 4/2006 | Del Pino et al. | |
| 2006/0148459 | A1 | 7/2006 | Wolfman et al. | |
| 2006/0205404 | A1 | 9/2006 | Gonen et al. | |
| 2006/0211420 | A1 | 9/2006 | Ophir et al. | |
| 2007/0021118 | A1 | 1/2007 | Ophir et al. | |
| 2007/0049269 | A1 | 3/2007 | Ophir et al. | |
| 2007/0054665 | A1 | 3/2007 | Elkarat et al. | |
| 2007/0072587 | A1 | 3/2007 | Della-Torre et al. | |
| 2007/0178885 | A1 | 8/2007 | Lev et al. | |
| 2007/0232300 | A1 | 10/2007 | Wolfman | |
| 2007/0259663 | A1 | 11/2007 | Weintraub et al. | |
| 2008/0020760 | A1 | 1/2008 | Elkarat et al. | |
| 2009/0122759 | A1 * | 5/2009 | Kumar et al. | 370/331 |

FOREIGN PATENT DOCUMENTS

| | | | |
|---|---|---|---|
| CA | 2281041 A1 | 2/2001 | |
| EP | 0899 974 A2 | 3/1999 | |
| GB | 2322998 | 9/1998 | |
| GB | 2379135 A * | 2/2003 | |
| WO | WO 98/26621 A2 | 6/1998 | |
| WO | WO 98/26626 A2 | 6/1998 | |
| WO | WO 00/01179 | 1/2000 | |
| WO | WO 00/18156 A | 3/2000 | |
| WO | WO 00/51375 A | 8/2000 | |
| WO | WO 00/79761 A | 12/2000 | |
| WO | WO 00/79825 A | 12/2000 | |
| WO | WO 01/22750 | 3/2001 | |
| WO | WO 01/65884 | 9/2001 | |
| WO | WO 02/41641 A2 | 5/2002 | |
| WO | WO 02/019667 | 7/2002 | |
| WO | 03/019969 A1 | 3/2003 | |
| WO | WO 03/019960 A1 | 3/2003 | |
| WO | WO 03/043367 A | 5/2003 | |

| WO | WO 03/065660 A | 8/2003 |
| WO | WO2004/075598 | 9/2004 |
| WO | WO 2004/081802 | 9/2004 |
| WO | WO2005/101857 | 10/2005 |
| WO | WO2008/012815 | 1/2008 |

OTHER PUBLICATIONS

"Digital Cellular Telecommunications system (Phase 2+); Universal Mobile Telecommunications system (UMTS); General Packet Radio Service (GPRS) Service description; Stage 2 (3GPP TS 23.060 Version 5.4.0 Release 5)" ETSI TS 123 060 V5.4.0, Dec. 2002, pp. 1-207 (XP-014007573), Dec. 2002.

"Digital Cellular Telecommunications system (Phase 2+); Universal Mobile Telecommunications system (UMTS); General Packet Radio Service (GPRS); GPRS Tunnelling Protocol (GTP) across the Gn and Gp Interface (3GPP TS 29.060 version 5.4.0 Release 5)" ETSI TS 129 060 V5.4.0, Dec. 2002, pp. 1-102 (XP-002298277).

Ala-Laurila, et al., "Wireless LAN Access Network Architecture for Mobile Operators," IEEE Communications Magazine, Nov. 2001, pp. 82-89 (XP-001107810).

Brunen, M. "Roaming im Zugangsnetz Mit OWLAN uberall zu Hause sein, "Net-Zeitschrift Fuer Kommunikationsmangement, Huthig Verlag, Heilderberg, 2002, pp. 39-42 (XP-001122438), Aug. 2002.

GSM Association Permanent Reference Document: IR.33, PRD IR.33 "GPRS Roaming Guidelines," version 3.2.0, Apr. 3, 2003, pp. 1-20 (XP-002298278).

Ostrowski, F., "Roaming und Handover zwischen UMTS und Funk-LA," NTZ (Nachrichtentechnische zeitschrift), 2002, pp. 24-26 (XP-001112263), Jun. 2002.

Telenor (origin GSMA), "Inter-PLMN Backbone Guidelines," S3z000005 3GPP TSG SA WG3 Security—S3#15bis, Ad-Hoc Meeting Nov. 8, 2000, pp. 1-30 (XP-002298276).

"Universal Mobile Telecommunications system (UMTS) NAS Functions Related to Mobile Station MS in Idle Mode" ETSI TS 123 122 V3.1.0, Jan. 2000, pp. 1-33.

"Digital Cellular Telecommunications System (Phase 2+) GSM; Univeral Mobile Telecommunications System (UMTS); Mobile Radio Interface Layer 3 Specification; Core Network Protocols, Stage 3" ETSI TS 124 008 V3.2.1, Jan. 2000, pp. 62-69 and 376.

Salman A. Baset et al., "An analysis of the Skype Peer-to-Peer Internet Telephony Protocol", Department of Computer Science, Sep. 15, 2004, 12 pages.

Salkintzis, et al., "WLAN-GPRS Integration for Next-Generation Mobile Data Networks," IEEE Wireless Communications, Oct. 2002, pp. 112-123 (XP-001132263).

Michael Mouly, "The GSM System for Mobile Communications", pp. 103-104. Cell and Sys, 1992. Jun. 1992.

GSM 378 on CAMEL Digital Cellular telecommunications system (Phase 2+);Customized Applications for Mobile network Enhanced Logic (CAMEL) Phase 2; Stage 2 (GSM 03.78 version 6.7.0 Release 1997), Nov. 1999.

GSM978 on CAMEL Application protocol Digital cellular telecommunications system (Phase 2+); Customized Applications for Mobile network Enhanced Logic (CAMEL); CAMEL Application Part (CAP) specification (GSM 09.78 version 7.1.0 Release 1998), Jul. 2000.

GSM 902 on MAP Specification Digital Cellular Telecommunications (Phase 2+); Mobile Application Part (MAP) Specification (3GPP TS 09.02 version 7.9.0 Release 1998), Dec. 2002.

Q760-Q769 on ISUP Signaling, Function and Procedure, May 1998.

Q.761 (Functional description of the ISDN User Part of CCITT Signaling System No. 7), Dec. 1999.

Q762 (General Functions of CCITT Signaling System No. 7 ISDN User Part Messages and parameters), Dec. 1999.

Q 763 (Formats and codes of CCITT Signaling System No. 7 ISDN User Part Message and parameters), Dec. 1999.

Q 764 (1999), Signaling System No. 7—ISDN User Part signaling procedures, Dec. 1999.

Q 730 (1999), ISDN User Part supplementary services, Dec. 1999.

Q 711 (1996), Functional description of signaling connection control part, Jun. 1996.

Q 712 (1996), Definition and function of signaling connection control part messages, Jun. 1996.

Q713 (1996), Signaling connection control part formats and codes, Jun. 1996.

Q 714 (1996), Signal connection control part procedures, Jun. 1996.

Q 716 (1993), Signaling Connection Control Part (SCCP) performance, Mar. 1993.

GSM 340 on SMS Digital cellular telecommunications system (Phase 2+); Technical realization of the Short Message Service (SMS); (GSM 03.40 version 7.4.0 Release 1998), Dec. 1999.

SMPP Forum: SMPP Protocol Document Version:—Oct. 12, 1999 Issue 1.2.

Universal Mobile Telecommunications System (UMTS); Multimedia Messaging Service (MMS), Functional description; Stage 2 (3GPP TS 23.140 version 4.2.0 Release 4), Dec. 2002.

GSM 379 on CAMEL Digital cellular telecommunications system (Phase 2+); Customized Applications for Mobile network Enhanced Logic (CAMEL); CAMEL Application Part (CAP) specification (GSM 09.78 version 7.1.0 Release 1998), May 1996.

Technical Specification $3^{rd}$ Generation Partnership Project; Technical Specification Group Services and System Aspects; Service accessibility (Release 1999), Dec. 2002.

Signaling procedure and the Mobile Application Part (MAP) (Release 1999), Dec. 2002.

Q1214-Q1218 on Intelligent Networks IMS architectures, 3GPP, and 3GPP2, Oct. 1995.

GMS 408 on radio interface layer 3; Digital cellular telecommunications system Phase 2+); Mobile radio interface layer 3 specification (GSM 04.08 version 7.4.2 Release 1998), May 1996.

GSM 322 network selection Digital cellular telecommunications system (Phase 2+); functions related to Mobile Station (MS) in idle mode and group receive mode (GSM 03.22 version 8.3.0 Release 1999), Apr. 2000.

GSM 23122 network selection 3GPP TS 23.122 V3.9.0 (Dec. 2002) Technical Specification; $3^{rd}$ Generation Partnership Project; Technical Specification Group Core Network; NAS Functions related to Mobile Station (MS) in idle mode (release 1999), Dec. 2002.

GSM 22011 service accessibility; 3 GPP TS 22.011 V3.8.0 (Sep. 2002) Technical Specification; $3^{rd}$ Generation Partnership Project; Technical Specification Group Services and System Aspects; Service accessibility (Release 1999), Oct. 2002.

3 GPP 29010; 3 GPP TS 29.010 V3.10.0 (Dec. 2002); Technical Specification; $3^{rd}$ Generation Partnership Project; Technical Specification Group Core Network; Information element mapping between Mobile Station—Base Station System (MS-BSS) and Base Station System—Mobile-services Switching Centre (BSS—MSC), Dec. 2002.

GSM 318 on CAMEL Basic Call Handling; Digital cellular telecommunications system (Phase 2+) Basic call handling; Technical realization (GSM 03.18 version 6.6.0 Release 1997), May 2000.

ITU-T Recommendation Q. 766 (1993), Performance objectives in the integrated services digital network application, Mar. 1993.

ITU-T Recommendation Q. 765 (1998), Signaling system No. 7—Application transport mechanism, May 1998.

ITU-T Recommendation Q. 769.1 (1999), Signaling system No. 7—ISDN user part enhancements for the support of Number Portability, Dec. 1999.

Q771-775X TCAP, Jun. 1997.

GSM 1111 SIM and Mobile Interface, Dec. 1995.

GSM 1114 SIM Toolkit, Dec. 1996.

IR 7320 Steering of Roaming, Apr. 2003.

GSM 348 Security and OTA, Dec. 2002.

GSM 31048 Security and OTA, Dec. 2002.

GSM 23119 Gateway Location Register, Dec. 2002.

GSM 408 Mobile Radio Interface Network Layer, Dec. 2002.

GSM 23122 Mobile Station Procedure, Dec. 2002.

GSM 24008 Mobile Radio Interface Network Layer, Jan. 2000.

GSM 25304 Idle Mode Selection, Dec. 2002.

GSM 29010 Error Network Mapping, Dec. 2002.

GSM 29002 MAP Protocol, Dec. 2002.

3G TS 22.078 version 3.2.0 Release 1999 UMTS CAMEL, Dec. 1999.
3G TS 23.278 version 6.0.0. Release 6 UMTS CAMEL-IMS interworking, Dec. 2004.
GSM 360 GPRS, Dec. 2002.
GSM 960 GPRS Tunneling Protocol, Dec. 2002.
GSM 23060 GPRS, Dec. 2002.
GSM 29060 GPRS Tunneling Protocol, Dec. 2002.
GSM 23012 Location Update, Dec. 2002.
Q701-705 on SS7 MTP, Jul. 1996.
ARIB STD-T63-31.048 V5.1.0 Security Mechanisms for the (U)SIM Application Toolkit, Test Specification (Release 5) 2005.
GSM 318 on CAMEL Basic Call Handling; Digital cellular telecommunications system (Phase 2+) Basic call handling; Technical realization (GSM 03.18 version 6.6.0 Release 1997).
GSM ETSI TS 100 930 Digital Cellular Telecommunications System (Phase 2+); Functions Related to Mobile Station (MS) in Idle Mode and Group Receive Mode (GSM 03.22 version 8.3.0 Release 1999).
Digital Cellular Telecommunications System (Phase 2+) GSM; Univeral Mobile Telecommunications System (UMTS); Signalling interworking between ISDN supplementary services; Application Service Element (ASE) and Mobile Application Part (MAP) protocols (3G TS 29.013 version 3.0.0 Release 1999).

* cited by examiner

METHOD AND SYSTEM FOR KEEPING ALL PHONE NUMBERS ACTIVE WHILE ROAMING WITH DIVERSE OPERATOR SUBSCRIBER IDENTITY MODULES

RELATED APPLICATIONS

This application is a continuation-in-part of U.S. patent application Ser. No. 11/699,505, entitled "Method and System for Keeping All Phone Numbers Active While Roaming with Diverse Operator Subscriber Identity Modules," filed on Jan. 30, 2007, claiming priority from Jan. 30, 2006. This application is also a continuation-in-part of U.S. patent application Ser. No. 10/782,681, entitled "Providing Multiple MSISDN in a Single SIM for multiple roaming partners", filed on Feb. 18, 2004, claiming priority from Feb. 18, 2003, and U.S. patent application Ser. No. 10/918,645, entitled "Signaling Gateway with Multiple IMSI with Multiple/Single MSISDN (MIMM/MSIM) Service in a Single SIM for Multiple Roaming Partners", filed on Aug. 13, 2004, claiming priority from Aug. 13, 2003. This application is also related to U.S. patent application Ser. No. 10/778,861, entitled "Signaling and Packet Relay Including General Packet Radio Services ("GPRS")," filed Feb. 13, 2004. The aforementioned patent applications are incorporated herein by this reference in their entireties.

FIELD OF THE INVENTION

The present invention generally relates to mobile communication. More specifically, the invention relates to mobile communication corresponding to Multiple Mobile Station International Subscriber Directory Numbers (MSISDNs) associated with Multiple International Mobile Subscriber Identity (IMSIs) for a subscriber.

BACKGROUND OF THE INVENTION

Mobile communication services are becoming increasingly popular. Hence, there is increasing competition between different mobile operators for building their roaming revenues. Mobile subscribers who frequently roam between two or more countries/networks contribute a majority of this roaming revenue. These mobile subscribers roam between their Home Public Mobile Network (HPMN) and one or more Visited Public Mobile Networks (VPMNs). The HPMN and the VPMNs can be in the same country or may be present in different countries. A local MSISDN of each of the VPMNs (i.e. VPMN MSISDNs) allows the roaming subscribers to call local subscribers of the VPMNs at cheaper local rates instead of expensive roaming rates. In addition, other local subscribers of the VPMN can also call these roaming subscribers of the HPMN at the local rates.

Usually, a roaming subscriber of the HPMN buys a new Subscriber Identity Module (SIM) of each VPMN he wants to visit. Hence, in such a case, the roaming subscriber needs to swap his HPMN SIM with the VPMN SIM, and therefore may not be able to receive call-related and non-call related services on his HPMN MSISDN. In addition, when the roaming subscriber returns to the HPMN, he cannot use call-related and non call-related services on his VPMN MSISDN. Therefore, it is desirable to facilitate mobile communication corresponding to both the HPMN MSISDN and VPMN MSISDNs.

In one technique (such as that taught by the present inventor in PCT Application Number WO US04/004975 entitled, "Providing Multiple MSISDN Numbers in a Mobile Device with a Single IMSI") to provide such a service to the roaming subscriber, the HPMN reserves a special range of HPMN IMSIs to provide the service. To subscribe for the service, the roaming subscriber needs to buy a special HPMN SIM card with an HPMN IMSI belonging to the special HPMN IMSI range. The HPMN assigns one or more VPMN MSISDNs to the subscriber upon subscription request and associates those VPMN MSISDNs with the HPMN MSISDN. The VPMN MSISDNs belong to a special range of VPMN MSISDNs reserved by each of the VPMNs. The roaming subscriber, when registered in the VPMNs, enjoys a local rate benefit on the VPMN MSISDNs and in addition, is able to receive call-related and non call-related services on the HPMN MSISDN. However, the roaming subscriber is able to use the services corresponding to his HPMN profile only, even when he is in the VPMN.

According to another technique (such as that taught by the present inventor in PCT Application Number WO WO US04/026410, entitled, "Signaling Gateway with Multiple IMSI with Multiple MSISDN (MIMM) Service in a Single SIM for Multiple Roaming Partners") to provide the service, the roaming subscriber carries a special SIM card that contains an HPMN IMSI and multiple VPMN IMSIs, with corresponding HPMN MSISDN and VPMN MSISDNs, respectively. When the roaming subscriber registers in one of the VPMNs, a SIM Tool-Kit (STK) application residing in the SIM card automatically detects the current location of the roaming subscriber and selects a corresponding IMSI and MSISDN. The roaming subscriber then enjoys the local rate benefit in the VPMN.

However, in one or more of the aforementioned techniques, the HPMN must reserve the special range of HPMN IMSIs and the VPMNs must reserve the special range of the VPMN MSISDNs. In addition, the VPMNs need to configure corresponding network elements of the VPMNs to route signaling messages, such as Signaling Connection and Control Part (SCCP) messages, to a Signaling Gateway (SG) hosted either in the HPMN or in the VPMNs. In addition, the roaming subscriber is unable to use services corresponding to his local VPMN profile. Furthermore, the VPMNs have to perform special billing procedures for these special range of IMSIs.

According to another technique to provide the service that contains a distributed network of nodes for handling the service, the roaming subscriber carries a special SIM card that contains an HPMN IMSI and a SIM Tool-Kit (STK) application. When the roaming subscriber registers with a VPMN with the HPMN IMSI in a first registration attempt, the STK application informs a VPMN node about the roaming subscriber's location and an HPMN node. The VPMN node will then send a VPMN IMSI and a corresponding VPMN MSISDN to the roaming subscriber's SIM card. The STK will cause the handset to initiate a second registration attempt with the VPMN IMSI this time. Thereafter, the VPMN node provides information to the HPMN node about the roaming subscriber, i.e. the roaming subscriber's location, the VPMN IMSI, and the VPMN MSISDN. The roaming subscriber then enjoys the local rate benefit in the VPMN. The VPMN node and HPMN node also coordinate to handle call and SMS services, on either a HPMN number or a VPMN number. However, in this approach two registration attempts are required before the roaming subscriber is treated a local subscriber. Furthermore, a distributed network of nodes consisting of HPMN node and a node in each VPMN the subscriber visits, is also required.

In accordance with the foregoing, there is a need in the art for a cost-effective solution for facilitating mobile communication corresponding to the HPMN MSISDN and multiple VPMN MSISDNs of the roaming subscriber.

SUMMARY

The present invention is directed to provide a method for proving mobile communication corresponding to Multiple MSISDNs associated with Multiple IMSIs of a subscriber. The method includes associating at a Signaling Gateway (SG), a first IMSI corresponding to a first network with one or more other IMSIs upon receipt of one or more association messages. The first and other IMSIs is associated with a subscriber using at least one SIM. Further, each IMSI has a corresponding MSISDN. The method further includes facilitating mobile communication corresponding to any associated IMSI and the corresponding associated MSISDN, irrespective of the IMSI being activated in the SIM.

An aspect of the invention presents a system for providing the "MIMM" (Multiple IMSI Multiple MSISDN) service. The system includes a Signaling Gateway (SG) coupled to the first network. The SG receives one or more association messages for associating a first IMSI corresponding to a first network with one or more other IMSIs. The first and other IMSIs are associated with a subscriber using at least one SIM. Further, each IMSI has a corresponding MSISDN. The SG further facilitates mobile communication corresponding to any associated IMSI and the corresponding associated MSISDN, irrespective of the IMSI being activated in the SIM.

Another aspect of the present invention provides a computer program product including a computer usable program code for providing MIMM service by, associating at a Signaling Gateway (SG), a first IMSI corresponding to a first network with one or more other IMSIs upon receipt of one or more association messages, and facilitating mobile communication corresponding to any associated IMSI and the corresponding associated MSISDN, irrespective of the IMSI being activated in the SIM.

BRIEF DESCRIPTION OF DRAWINGS

In the drawings, the same or similar reference numbers identify similar elements or acts.

DETAILED DESCRIPTION

Figure 1:
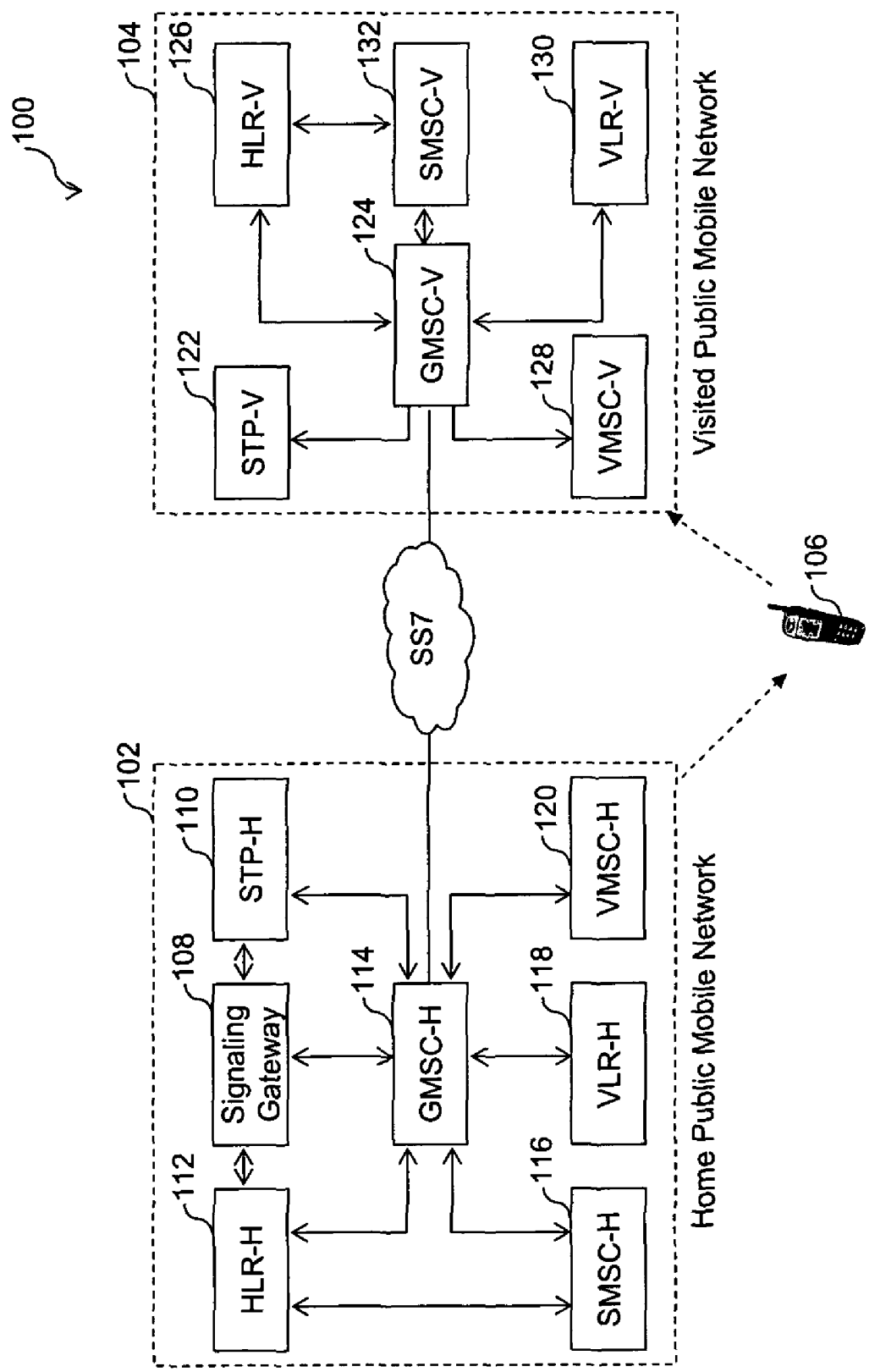
FIG. 1 represents a system for implementing Multiple IMSI Multiple MSISDN (MIMM) Service, in accordance with an embodiment of the invention.

In the following description, for purposes of explanation, specific numbers, materials and configurations are set forth in order to provide a thorough understanding of the invention. It will be apparent, however, to one having ordinary skill in the art, that the invention may be practiced without these specific details. In some instances, well-known features may be omitted or simplified, so as not to obscure the present invention. Furthermore, reference in the specification to "one embodiment" or "an embodiment" means that a particular feature, structure or characteristic, described in connection with the embodiment, is included in at least one embodiment of the invention. The appearance of the phrase "in an embodiment", in various places in the specification, does not necessarily refer to the same embodiment.

The present invention provides a system, method and a computer program product for facilitating Multiple IMSI Multiple MSISDN (MIMM) service. The system facilitates MIMM service for a subscriber who is associated with an HPMN, with a corresponding first IMSI and first MSISDN, but may be roaming in a VPMN with a VPMN SIM and its corresponding second IMSI and second MSISDN. The HPMN IMSI and HPMN MSISDN are hereinafter referred to as IMSI-H and MSISDN-H respectively. Likewise, the VPMN IMSI and VPMN MSISDN are hereinafter referred to as IMSI-V and MSISDN-V. Further, the system may be interchangeable referred to as MIMM system. The system enables registration of the subscriber in the VPMN with a VPMN IMSI and VPMN MSISDN while keeping the MSISDN-H active, thus applying local rates for the subscriber in the VPMN. The former embodiment of multiple VPMN SIMs requires the subscriber to swap the HPMN SIM with the VPMN SIM whenever he wishes to use the MIMM services in corresponding VPMN network. Usually, in such a case, the operator implementing the MIMM service will form partnership with one or more VPMNs, and may refer them as FPMNs. Hereinafter, VPMNs may be interchangeably referred to as FPMNs. Further, the operator may procure prepaid or postpaid SIMs from these VPMN operators offer the same to its subscribers, who subscriber to the MIMM service. However, in latter embodiment of single HPMN SIM with multiple VPMN IMSIs, the subscriber either manually chooses the VPMN IMSI corresponding to the VPMN country or the STK application automatically selects the correct VPMN IMSI-V. The system provides a seamless implementation to allow a plurality of services, but not limited to, call related and non-call related (i.e. VAS) for all its subscribers.

In one embodiment, the present invention can also support postpaid VPMN IMSI/MSISDN in the VPMN profiles; however in this case, it will require a special billing process and special IMSI/MSISDN range, unless the postpaid users are also subscribers of VPMN operators. Such a scenario is best handled as described in U.S. patent application Ser. No. 10/918,645, entitled "Signaling Gateway with Multiple IMSI with Multiple/Single MSISDN (MIMM/MSIM) Service in a Single SIM for Multiple Roaming Partners", filed on Aug. 13, 2004, one of the parent applications of the present application. The procedure described in this parent application does not require a VPMN profile or a VPMN authentication procedure. Nevertheless, if the postpaid subscribers have separate accounts with the VPMN operators, i.e., each postpaid sucscriber is separately responsible for the VPMN operators' bill, there may be no need for the special billing process, in accordance with one embodiment of the present invention.

In the case of prepaid VPMN local number, there are no special billing changes (other than the prepaid reseller or distributor relationship). In the case of postpaid, special billing will be required since the customers belong to a HPMN, unless the subscriber also has a direct billing relationship with the VPMN operator. The billing can be done via a MVNO operator, for example.

One embodiment of the present invention provides an alternative to the solution described in U.S. patent application Ser. No. 10/778,861, entitled "Signaling and Packet Relay Including General Packet Radio Services ("GPRS", filed Feb. 13, 2004, on supporting a sponsored operator's subscriber to roam in a VPMN operator that only has a roaming relationship with a sponsor operator not with the sponsored operator. In this case, the sponsored operator's subscriber can simply take a sponsor operator SIM (with or without using a dual IMSI SIM) to the VPMN operator. It is particularly attractive for the case of just using a sponsor operator SIM since dual IMSI SIMs can be a lengthy logistic process. The sponsored operator's subscriber can just obtain a prepaid or postpaid sponsor operator SIM and roam in the VPMN operator without losing calls and SMS on his sponsored operator phone number.

MIMM System

FIG. 1 represents a system 100 for facilitating MIMM service. The system includes an HPMN 102, and a VPMN 104 exchanging signaling via SS7 network. A subscriber 106 is originally associated with HPMN 102, and may be roaming in VPMN 104. The HPMN 102 includes a Signaling Gateway (SG) 108, coupled to an STP-H 110. The HPMN 102 further includes an HLR 112, a GMSC 114, an SMSC 116, a VLR 118, and a VMSC 120, all interconnected and communicating via SS7 signaling. Since HLR 112, GMSC 114, SMSC 116, VLR 118, and VMSC 120 reside in HPMN 102, they are hereinafter, referred to as an HLR-H 112, a GMSC-H 114, an SMSC-H 116, a VLR-H 118, and a VMSC-H 120. The VPMN 104 includes an STP 122, a GMSC 124, an HLR 126, a VMSC 128, a VLR 130, and an SMSC 132, all interconnected and communicating via SS7 signaling. Since STP 122, GMSC 124, HLR 126, VMSC 128, VLR 130, an SMSC 132 reside in VPMN 104, they are hereinafter, referred to as an STP-V 122, a GMSC-V 124, an HLR-V 126, a VMSC-V 128, a VLR-V 130, and an SMSC-V 132. It would be apparent to a person skilled in the art that any network element in HPMN 102, VPMN 104, and original network 106, may communicate with any other element in other network via SS7 signaling. Furthermore, HPMN 102, and VPMN 104 may include other network components that are standard, depending upon the architecture under consideration.

HPMN 102 allocates an HPMN SIM to a first IMSI and a corresponding first MSISDN when subscriber 106 registers with HPMN 102. However, subscriber 106 may visit one or more VPMN networks. There are two ways to offer the MIMM service in such a case. In the first case, subscriber 106 may receive multiple VPMN SIMs (for each VPMN network/country he plans to visit) from HPMN 102. The HPMN operator may form a partnership with one or more VPMN operators and procure multiple VPMN SIMs (postpaid or prepaid) from its subscriber. Alternatively, the subscriber may not have to pre-buy and pre-register a partner VPMN SIM before embarking on a trip. The subscriber may buy the VPMN SIM once he visits that VPMN network/country. In one embodiment of the invention, the partnership may be with different VPMN operators in same country. In another embodiment of the invention, the partnership may be with different VPMN operators in different countries.

In the case where a subscriber is able to purchase a SIM from the participating VPMN on his arrival in the visited country, the VPMN, or SIM reseller, may promote the service by sending the subscriber a "Welcome SMS" message or other notification as is known in the art, upon the subscriber's arrival in the visited country, or the VPMN's territory.

Such a Welcome SMS message or other notification could contain a hyperlink or callback number which the subscriber could activate to receive more information about obtaining a VPMN SIM enabling a MIMM service. Alternatively, the message itself could contain information directing the subscriber to where he might purchase a MIMM enabling SIM. In another alternative, based on detecting the subscriber handset location, the message or notification can direct the subscriber to the nearest store selling the VPMN SIM enabling the MIMM service. Alternatively, a user could activate the message to elect receiving such a SIM, and based on the handset location, a delivery person could deliver the SIM to the subscriber (e.g. at the customs or baggage claim exit, at the rental car counter, or at the subscriber's hotel.)

Referring to a scenario in which the MIMM service is offered by more than one VPMN within the same territory, the subscriber may also use an HPMN SIM with multiple VPMN IMSIs in the same SIM, to avoid changing the SIM each time he changes the VPMN network. In both cases, the VPMN operator can provide local handset configuration information, such as but not limited to, GPRS, MMS and WAP. The VPMN operator also provides IMSI, Ki and SMSC information in multiple IMSI in a single SIM implementation to the HPMN operator. The multiple IMSI SIM has a special STK application that modifies the IMSI and Ki entry. The SIM is also equipped with different authentication algorithms for A3 and A8. Usually, operators follow GSM recommended algorithms for A3 and A8, however, some exceptions such as Vodafone™ require modified algorithms. In such cases, these special SIMs may be manufactured by SIM vendors such as Bluefish and Axalto/Gemplus. Moreover, different client applications such as, but not limited to, BREW, Symbian, Java™, Microsoft®, and Linux™ may be used instead of STK. While similar or more advanced implementations are also possible within the scope of this invention, STK is used only as an exemplary implementation.

A special file called IMSI-Subscription is present in the SIM. This file contains records in the following possible formats, in accordance with various embodiments of the present invention.

a) MCC IMSI Ki Algorithm-Index SMSC-Address

The first entry may be the home country record post-fixed by H.

b) MCC-H IMSI-H Ki-H Algorithm-Index-H SMSC-H

In another embodiment of the invention, MCC may be a wildcard such as "*". This is usually applicable with the HPMN IMSI as the last entry in the file.

c) * HPMN-IMSI Ki-HPMN Algorithm-Index-HPMN HPMN-SMSC

Usually, MCC is supported by a MCC-matching IMSI. For example, a China MCC 460 can be supported by a 46001-X IMSI.

d) 460 46001-X Ki Algorithm-Index 46001-SMSC

However, MCC also can be supported by an IMSI that does not have the identical MCC. For example, Netherlands MCC (204) may be supported by a Belgium IMSI with MCC 206.

e) 204 20610-X Ki Algorithm-Index 20610-SMSC

Similarly, there could also be multiple entries for the same MCC with different IMSIs. For example, two different China IMSIs (China Mobile and China Unicom, respectively) may support China.

f) 460 46000-X Ki-X Algorithm-Index-X 46000-SMSC
g) 460 46001-Y Ki-Y Algorithm-Index-Y 46001-SMSC In yet another example, two different Belgium IMSIs (e.g. MobileStar and Proximus) might support Netherlands.

i) 204 20610-X Ki-X Algorithm-Index-X 20610-SMSC
j) 204 20601-Y Ki-Y Algorithm-Index-Y 20601-SMSC In addition, in some particular cases, there could be another IMSI support as well for the same country. For example, a Netherlands IMSI (e.g. ONL 20420-X) may best support Netherlands. However, if the IMSI 20420 ONL does not have coverage at any spot in Netherlands, an alternative Belgium IMSI may be used (e.g. Mobilestar IMSI 20610-Y). However, the same country order is based on preference settings.

k) 204 20420-X Ki-X Algorithm-Index-X 20420-SMSC
l) 204 20610-Y Ki-Y Algorithm-Index-Y 20420-SMSC The switching of IMSIs is transparent to the subscriber, although there may be a manual selection mechanism via a menu for the subscriber to select a VPMN IMSI. When the subscriber registers in a network with any current IMSI in the SIM, the STK application is able to know the network and the country in which the subscriber is registered. Further, when the subscriber is unable to register with a network corresponding to the current IMSI in the SIM, the STK application is aware of the present country of the subscriber by referring to the forbidden list in the SIM. Thereafter, the STK application chooses the optimum IMSI from the subscriber's IMSI-Subscription file for that country. In case no matching entry for IMSI is found, the default is set to HPMN IMSI.

Otherwise, the STK application loads the located IMSI, and its corresponding Ki into the corresponding SIM location, and sets the current security algorithms to those as indexed by the Algorithm-Index of the located IMSI. The STK application then forces a re-registration process. This process repeats itself until either the subscriber is registered with a network in the current country, or it fails to register with a network with all the IMSIs that are suitable for that country. If at any given time, the subscriber is registered with an IMSI for a country that has a preferred IMSI, the STK application periodically performs the replacement to check for the more preferred IMSI, in decreasing order of preference.

When subscriber 106 buys these partner VPMN SIMs, or uses the original HPMN SIM with VPMN IMSIs, the HPMN operator performs the registration process required for each VPMN operator via various methods such as, but not limited to, a customer care shop, a retail shop, and a kiosk (e.g., at an airport). In addition, the registration process may include a requirement of the subscriber's identification details, at the VPMN operator, which may be sent by the HPMN operator via an IP network, such as email. SG 108 residing in HPMN 102 performs this registration process. SG 108 authenticates each VPMN SIM and its corresponding IMSI in the local network to which it is associated. Furthermore, SG 108 maintains a local profile of subscriber 106 corresponding to the IMSI activated in his SIM. In other words, the local service at VPMN 104, such as SMS, call, supplementary services, and data, will be conforming to his local VPMN profile rather than HPMN 102's profile. It will be apparent to a person skilled in the art, that HPMN 102 operator may be an MVNO operator hosting SG 108. The process of association of HPMN IMSI-H and MSISDN-H, with one or more VPMN IMSI-V and MSISDN-V, is described in conjunction with FIGS. 2A and 2B.

Figure 2A:
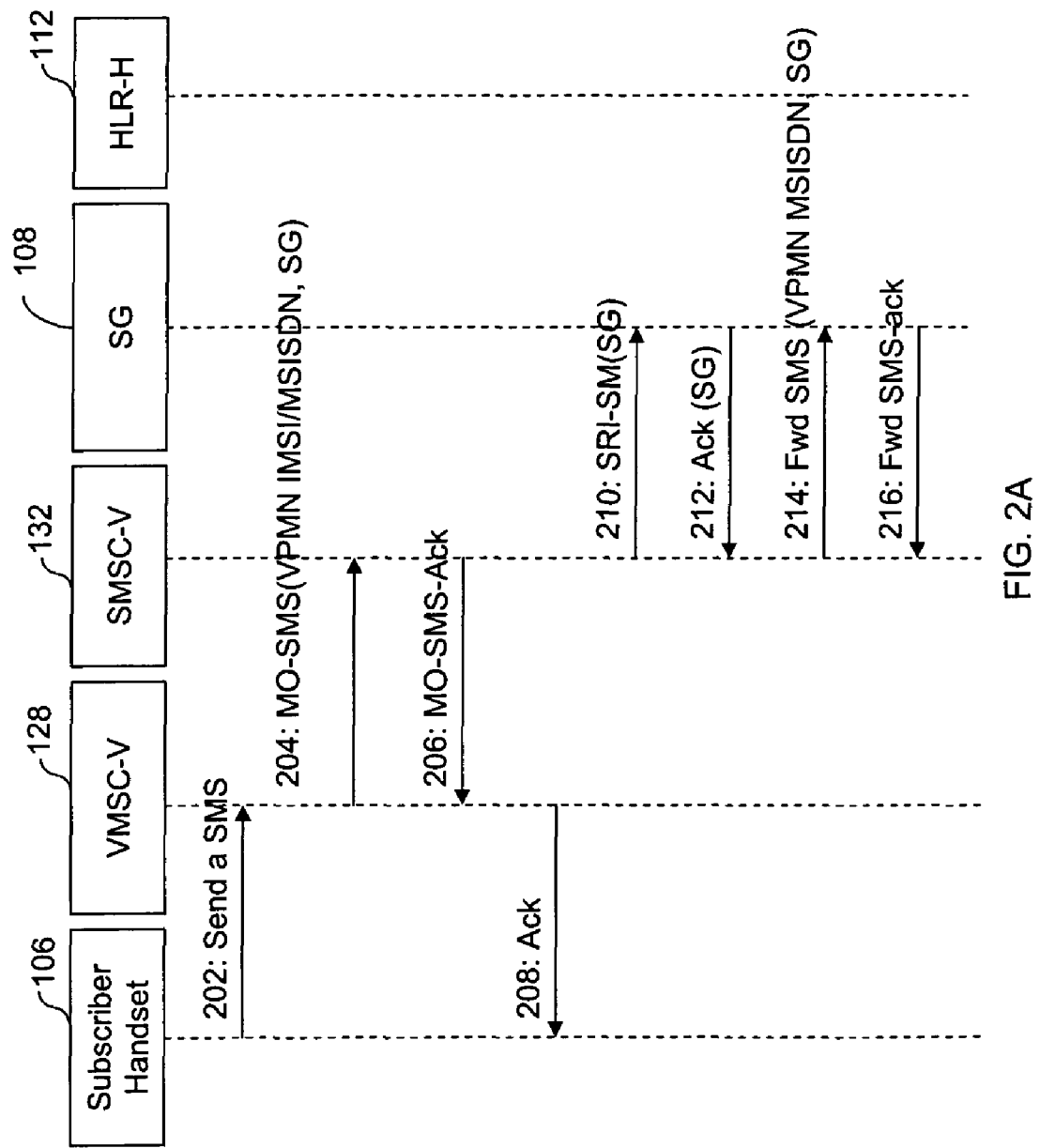
FIGS. 2A and 2B represent a flow diagram for registering an HMPN IMSI with one or more VPMN IMSIs for a subscriber, in accordance with an embodiment of the invention.
Figure 2B:
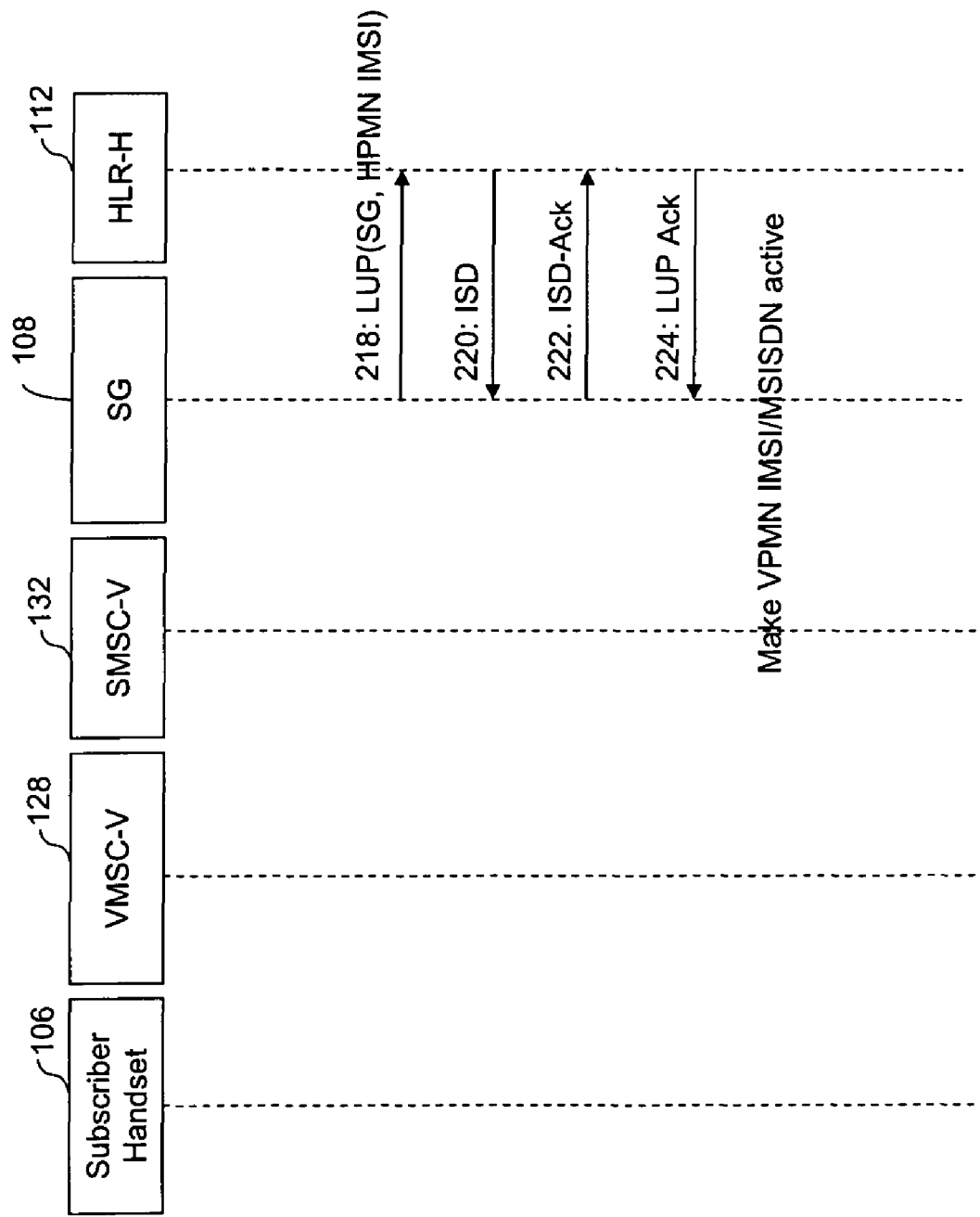

FIGS. 2A and 2B represent a flow diagram for associating an HMPN IMSI with one or more VPMN IMSIs for a subscriber, in accordance with an embodiment of the invention. The association process includes an electronic registration process, such as via a secure web interface, to associate the subscriber's HPMN IMSI-H and MSISDN-H with the VPMN IMSI-V and MSISDN-V of each VPMN SIM the subscriber possesses. Subscriber 106 initiates the association process, and unless instructed, only HPMN IMSI-H and MSISDN-H are active. When subscriber 106 visits VPMN 104 with a corresponding VPMN SIM, he swaps the VPMN SIM in the handset and sends an SMS (an association message) to an SME address of HPMN 102 (i.e. a HPMN-MVNO long number) to SG 108, after registering with VPMN 104 using ISMI-V. In other embodiments of the invention, the association message may be other messages like MMS, and USSD. In another embodiment of the invention, an STK application residing in the subscriber's SIM sends this SMS to SG 108. As an exemplary case, at step 202, subscriber 106 sends an SMS to the HPMN 102's long number i.e. Global Title (GT) of SG 108. The SMS includes IMSI-V and MSISDN-V information, which needs to be associated with IMSI-H and MSISDN-H, respectively. Since subscriber 106 is already registered with IMSI-V at VPMN 104, the SMS lands at VMSC-V 128. Thereafter, at step 204, VMSC-V 128 relays the SMS to SMSC-V 132. SMSC-V 132 acknowledges the receipt of the SMS at step 206. At step 208, VMSC-V 128 relays the acknowledgement to subscriber 106's handset. Thereafter, at step 210, SMSC-V 132 sends a routing information query, such as SRI-SM, to SG 108. In response to this, SG 108 acknowledges the receipt of the routing information query, at step 212. Hence, at step 214, SMSC-V 132 forwards the SMS with MSISDN-V to SG 108. SG 108, at step 216, acknowledges the receipt of the forwarded message.

Upon receiving the SMS as the association message at SG 108, it acquires IMSI-H of subscriber 106 by issuing a MAP SRI-SM query or Send IMSI query on MSISDN-H to HLR-H 112. Thereafter, at step 218, SG 108 issues a location update such as, a MAP LUP, on the IMSI-H of subscriber 106 to HLR-H 112, with the assigned HPMN GT as VMSC-V 128 and VLR-V 130. In one embodiment of the invention, the subscriber's profile corresponding to IMSI-H does not necessarily have to be granted for roaming. In another embodiment of the invention, SG 108 uses special fictitious foreign GT to fake as VLR-V 130 and VMSC-V 128, when roaming is a pre-requisite for subscriber 106's profile at HLR-H 112. However, in such a case, STP-H 110 is configured to route these fictitious foreign GT-destined SCCP messages towards SG 108. Thereafter, at step 220, HLR-H 112 issues an ISD message to SG 108. SG 108, at step 222, acknowledges the ISD message. Finally, at step 224, HLR-H 112 acknowledges LUP message to activate and associate the IMSI-V and MSISDN-V of subscriber 106 to IMSI-H and MSISDN-H. Hence, SG 108 facilitates mobile communication corresponding to associated MSISDNs and IMSIs, irrespective of IMSI active in the SIM.

As described above, subscriber 106 is able to have both IMSI-H and IMSI-V active, in order to make and receive calls and other VAS on the corresponding MSISDNs. However, the subscriber is not able to have multiple VPMN MSISDNs active along with HPMN MSISDN. It will be apparent to a person skilled in the art that in order to provide such facility to the subscriber, the association process described in conjunction with FIGS. 2A and 2B can be generalized for multiple associations. The subscriber at each VPMN country (including the HPMN) sends a registration SMS to SG 108 in the multiple VPMN SIMs approach. Alternatively, STK application in the SIM sends the SMS in multiple IMSI in a single HPMN SIM approach. When SG 108 receives the SMS by the subscriber indicating the subscriber's current country, SG 108 uses the sender MSISDN to locate all other subscriber's associated IMSIs. For each associated IMSI, SG issues a LUP message (as done at step 218) to the corresponding HLR with the GT of SG 108 as the address of that VMSC/VLR. The location update process as explained in steps 218 to 224 are repeated for each associated VPMN IMSI including the IMSI-H. This provides a perception that the subscriber is roaming, or is not in HPMN 102. However, since the GT of SG 108 is an HPMN GT, for any IMSI other than IMSI-H, subscriber 106 should have roaming allowance in his VPMN profile for IMSI-V. This enables subscriber 106, to remain active with any VPMN MSISDN, irrespective of his current location.

In one embodiment of the invention, SG 108 maintains a database of the association between IMSI-H, MSISDN-H and IMSI-V and MSISDN-V. Hence, subscriber 106 gets the benefit of local rate calling even when he is in VPMN 104, as his VPMN SIM and IMSI are associated with HPMN SIM and IMSI. Subscriber 106 is able to make and receive calls and messages in VPMN 104 as a local VPMN subscriber. As an exemplary case, Mobile Originated (MO) SMS from subscriber 106 with VPMN SIM in VPMN network is treated as a local subscriber. Hence, SMSC-V 132 is used and caller identification while sending the SMS is MSISDN-V instead of MSISDN-H. Similarly, a Mobile Terminated (MT) SMS or call on MSISDN-V, is treated as a local SMS and call in VPMN 104, respectively.

Figure 3A:
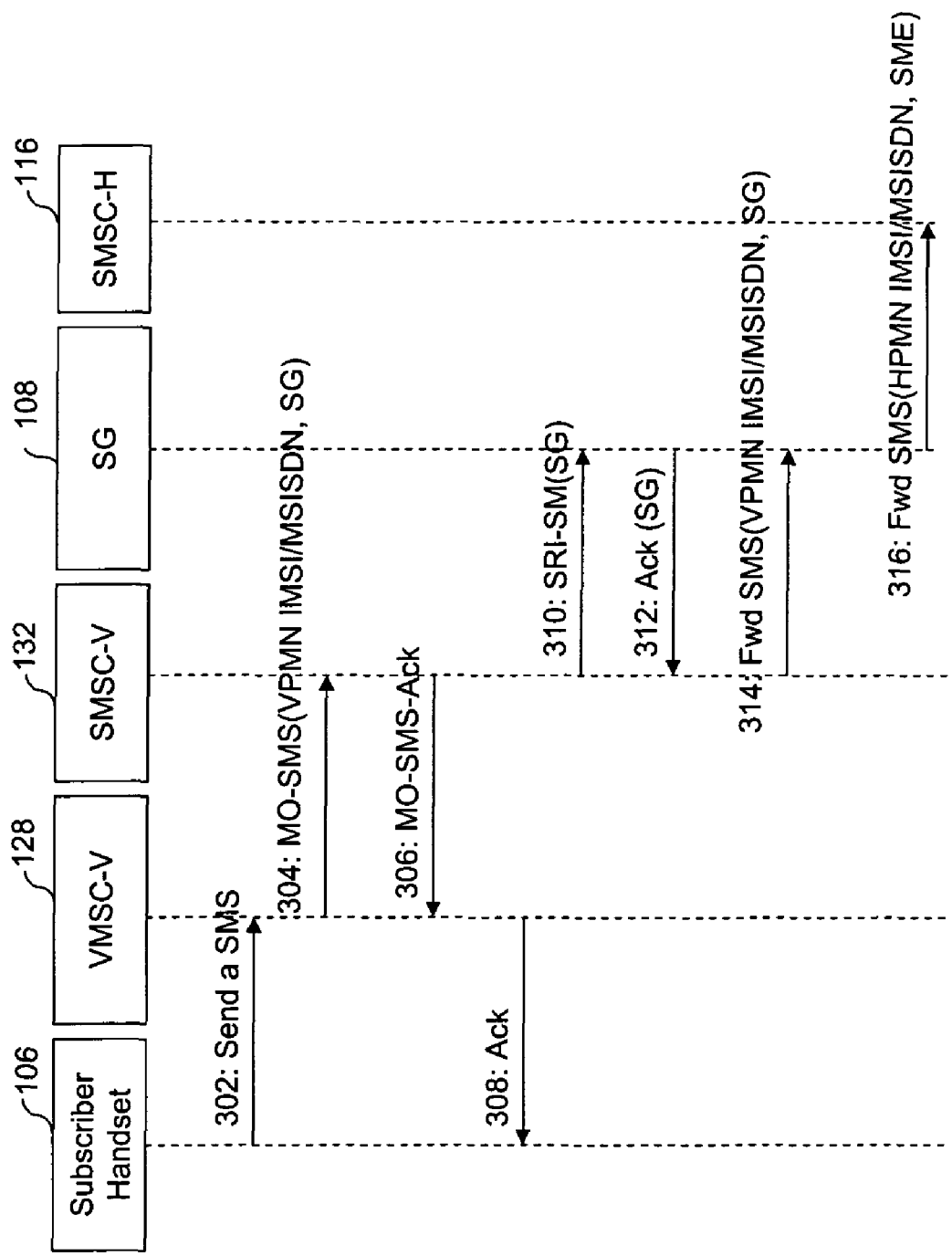
FIGS. 3A and 3B represent a flow diagram of MO SMS from an HPMN MSISDN of the subscriber, in accordance with a first embodiment of the invention.
Figure 3B:
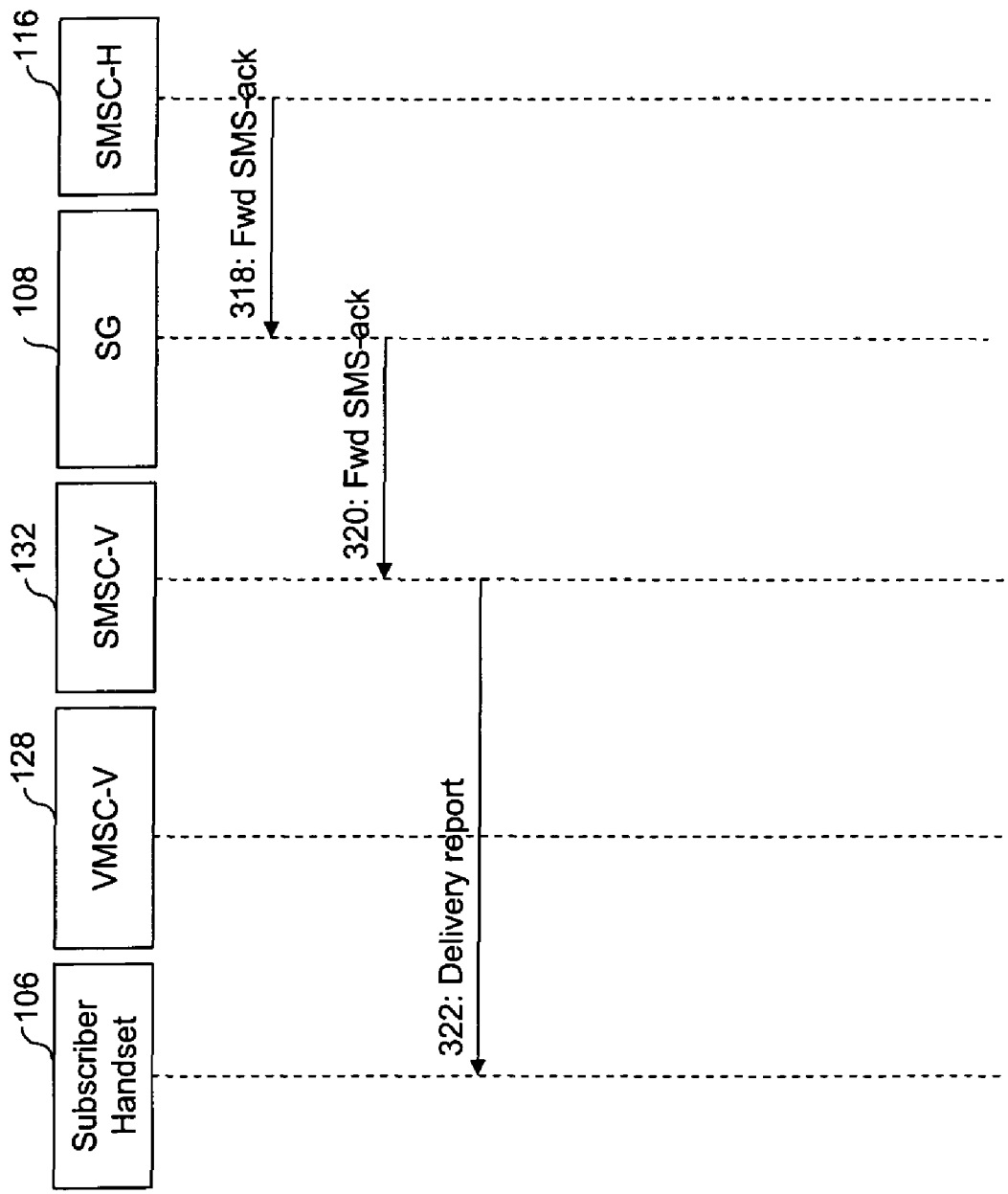

Alternatively, subscriber 106 may wish to use services corresponding to his HPMN profile. The services may include, but may not be limited to, information service, call back service, and profile information change. In such a case, he may use HPMN SIM in VPMN 104, if roaming is supported in his HPMN profile to send a short code message to HPMN SME service. FIGS. 3A and 3B represent a flow diagram of MO SMS from an HPMN MSISDN of the subscriber, in accordance with a first embodiment of the invention. At step 302, subscriber 106 sends an SMS to an HPMN SME address, which is GT of SG 108, but since the subscriber is present in VPMN 104, the SMS reaches VMSC-V 128. At step 304, VMSC-V 128 forwards this SMS (with IMSI-V and MSISDN-V) to SMSC-V 132. SMSC-V 132, at step 306, returns an acknowledgement of receipt of the SMS. VMSC-V, at step 308, relays this acknowledgement to the subscriber 106's handset. Thereafter, at step 310, SMSC-V 132 sends a routing information query, such as SRI-SM to SG 108. At step 312, SG 108 acknowledges the SRI-SM query to SMSC-V 132. Thereafter, at step 314, SMSC-V 132 forwards the SMS to SG 108.

Usually, when the subscriber sends the SMS to HPMN SME address, the short code for the HPMN SME address is present in the first line of the SMS. For example, +123 is a short code address. When SG 108 receives the forwarded SMS, SG 108 checks in its database for association between IMSI-V and IMSI-H and their corresponding MSISDNs. In accordance with one embodiment of the present invention, at step 316, SG 108 removes this first line and relays the forwarded SMS to SMSC-H 116 by changing the IMSI-V and MSISDN-V, with IMSI-H and MSISDN-H, respectively. In addition, SG 108 also replaces the address of VMSC-V as the address of SG 108. This enables acknowledgment and delivery receipt to SG 108 itself, at step 318. At step 320, SG 108 forwards the received SMS acknowledgement to SMSC-V 132. Thereafter, at step 322, SMSC-V 132 sends a delivery report to subscriber 106's handset. In accordance with another embodiment of the present invention, SG 108 removes the first line of the SMS and delivers the SMS itself, by performing the functions of an SMSC. Hence, in this case, SG 108 itself does the acknowledgment and delivery receipt of the SMS. By doing so, subscriber 106 can send SMS using any of MSISDN-H or MSISDN-V depending on the profile settings.

Figure 4:
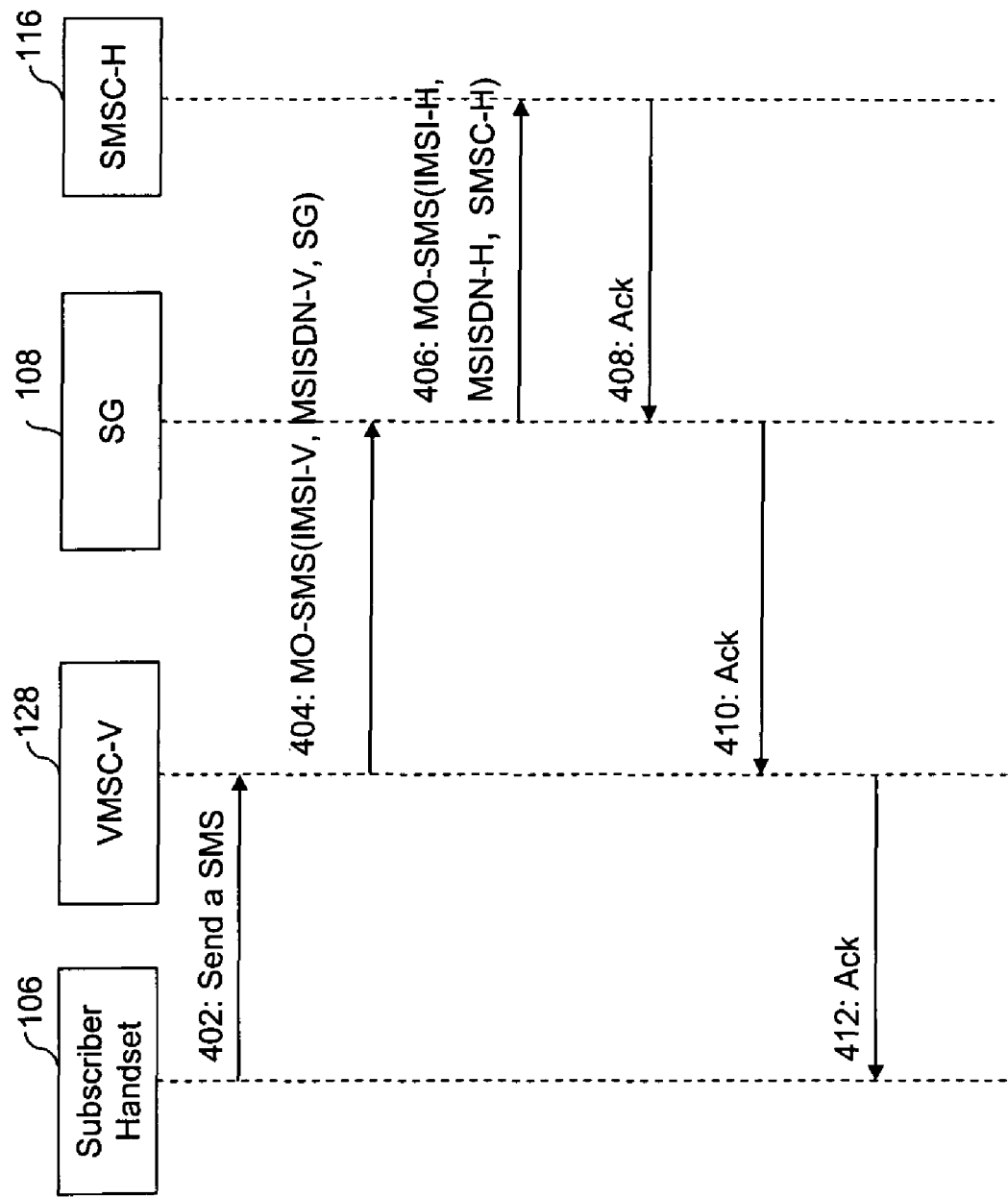
FIG. 4 represents a flow diagram of MO SMS from the HPMN MSISDN of the subscriber, in accordance with a second embodiment of the invention.

The HPMN operator can choose to have SMS always going through HPMN 102, instead of SMSC-V 132, as described in FIGS. 2A and 2B. By doing so, subscriber 106 can access HPMN SME applications. However, this method case requires the STK application to select the corresponding SMSC address for the selected IMSI. The STK application will present the two options, as part of its menu for a subscriber, to select and switch at any time. FIG. 4 represents a flow diagram of MO SMS from the HPMN MSISDN of the subscriber, in accordance with a second embodiment of the invention. At step 402, subscriber 106 sends an SMS to an HPMN SME address, which is the GT of SG 108, but since the subscriber is present in VPMN 104, the SMS reaches VMSC-V 128. Since the address of SMSC-V 132 is the GT of SG 108, hence, at step 404, VMSC-V 128 sends this SMS (with IMSI-V and MSISDN-V) to SG 108. Thereafter, at step 406, SG 108 replaces IMSI-V by IMSI-H, and MSISDN-V by MSISDN-H, sends the SMS by changing the CdPA SMSC-H 116. At step 408, SMSC-H 116 sends the acknowledgement of the SMS. SG 108 relays this acknowledgement at step 410 to VMSC-V 128, which in turn, relays it to subscriber's handset at step 412. Hence, subscriber 106 is able to use the HPMN SME applications.

Figure 5:
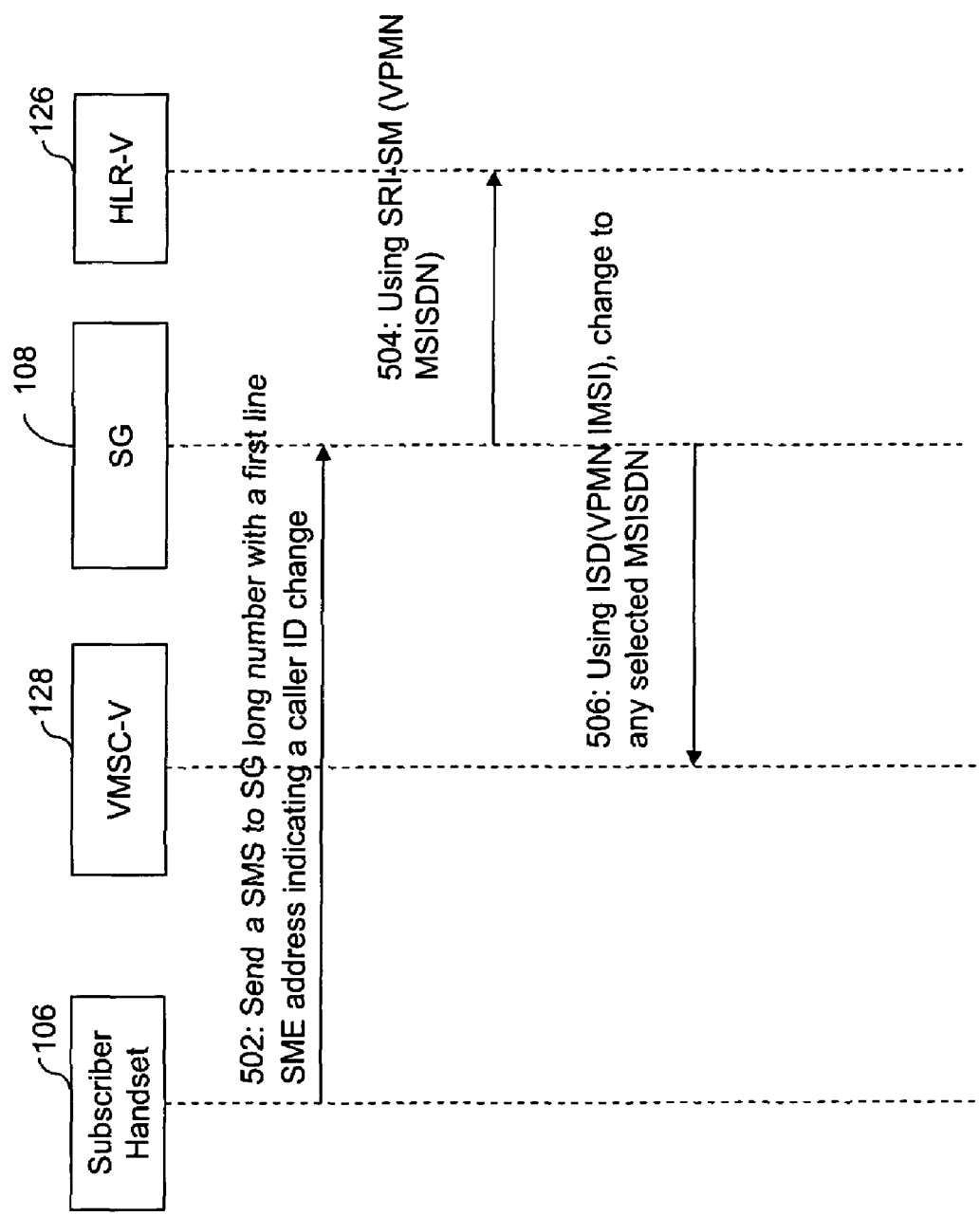
FIG. 5 represents a flow diagram of MO call from the subscriber using any associated MSISDN, in accordance with an embodiment of the invention.

In accordance with one embodiment of the invention, subscriber 106 at VPMN 104 is able to make calls with a caller ID (MSISDN) of his choice. FIG. 5 represents a flow diagram of MO call from the subscriber using any associated MSISDN, in accordance with this embodiment of the invention. At step 502, subscriber 106 sends an SMS to the long HPMN SME number with a SME address (i.e. GT of SG 108) in the first line of SMS indicating the preferred MSISDN. This MSISDN can be MSISDN-H, MSISDN-V, or any other associated VPMN MSISDN. Since the HPMN SME address points to SG 108, at step 504, SG 108 issues a routing query such as, MAP SRI-SM with MSISDN-V, to retrieve VMSC/VLR address and IMSI-V. Thereafter, at step 506, SG 108 issues a stand-alone MAP-ISD message to VMSC-V 128 with SSN equal to 6, IMSI-V and MSISDN number equal to the desired caller ID.

In addition, subscriber is also able to use VAS, such as GPRS and MMS, using his HPMN or VPMN SIM. MO-GPRS service such as, but may not be limited to, WAP, email and MMS, initiated by the subscriber 106 using a VPMN SIM, are treated as a local subscriber in VPMN 104. In this case, VPMN SGSN and VPMN GGSN will be used. In addition, in all the GPRS signaling exchange, MSISDN-V is displayed. However, if any GPRS service ties with HPMN 102 for security reason or VPMN establishment, then subscriber 106 can use HPMN SIM if roaming is allowed on his HPMN profile. If VPMN 104 is a partner network of HPMN 102, then HPMN 102 assigns a special HPMN APN name to subscriber 106's handset if HPMN's original APN name conflicts with the VPMN APN name.

Figure 6A:
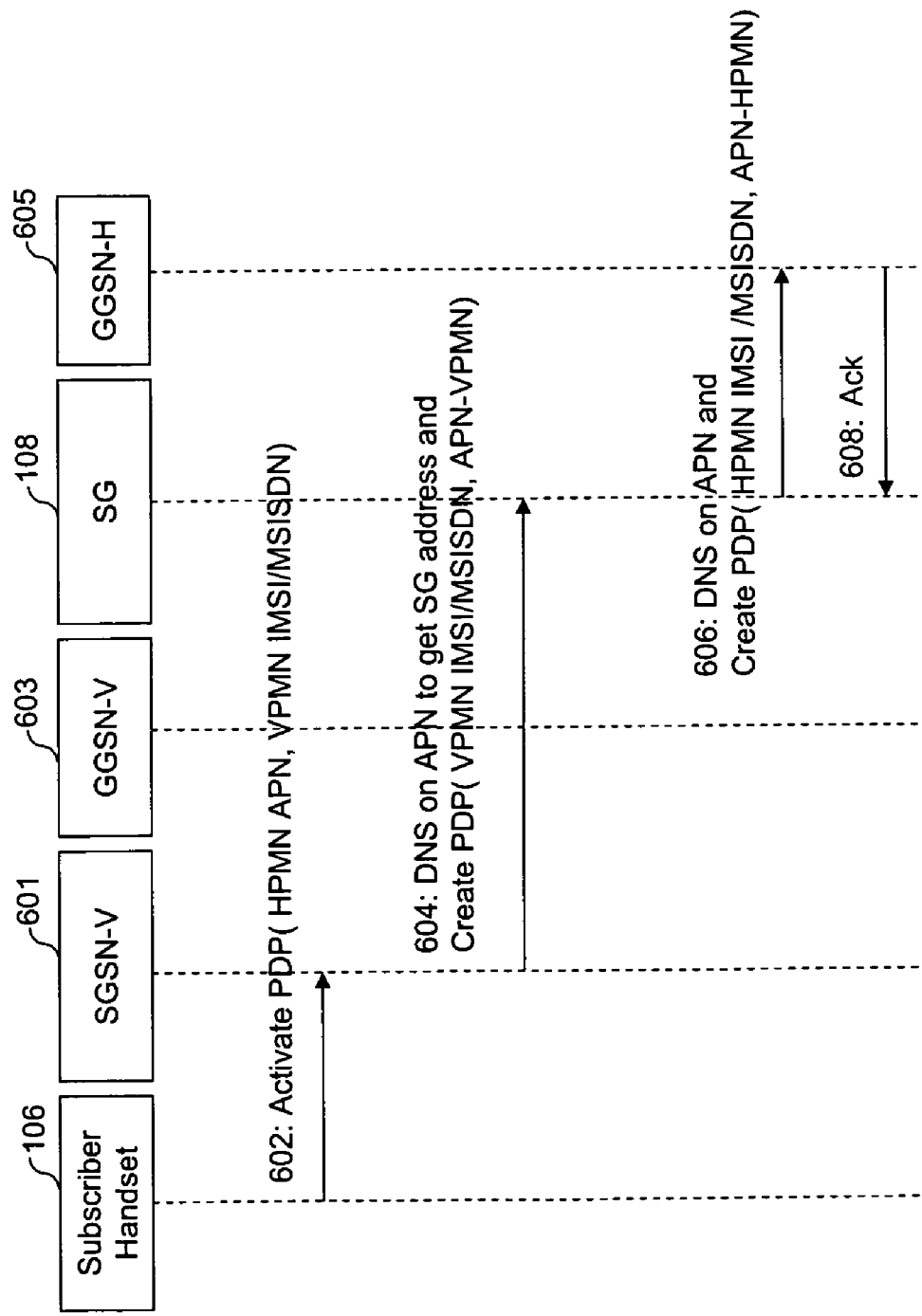
FIGS. 6A and 6B represent a flow diagram of MO GPRS session from the subscriber using HPMN APN, in accordance with an embodiment of the invention.
Figure 6B:
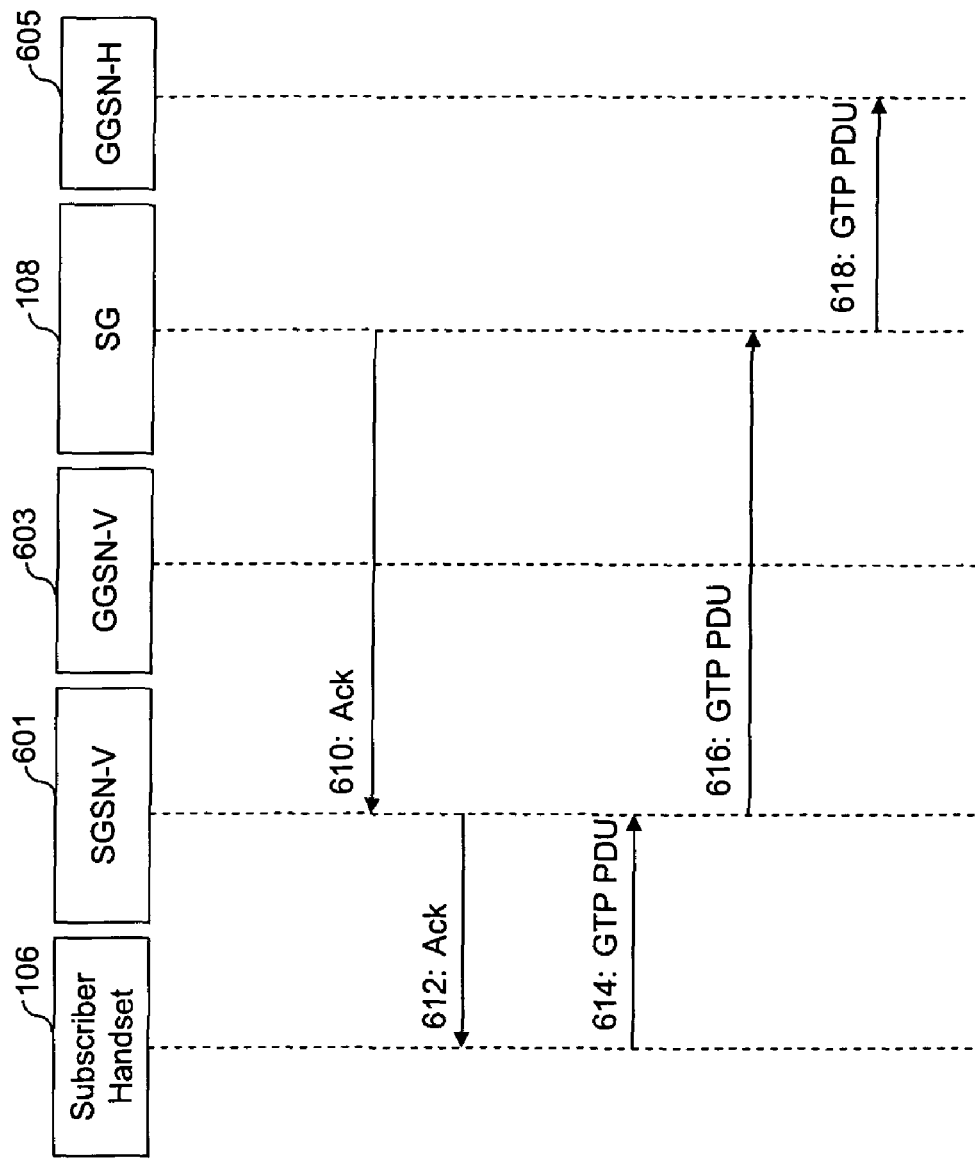

FIGS. 6A and 6B represent a flow diagram of MO GPRS session from the subscriber using the HPMN APN, in accordance with an embodiment of the invention. In order to implement GPRS services, certain other relevant network elements are also included in HPMN 102 and VPMN 104. VPMN 104 includes SGSN-V 601 and GGSN-V 603 to support GRPS related services. Similarly, HPMN 102 includes a GGSN-H 605 to provide support for GPRS related services. At step 602, subscriber 106 sends an activate PDP context request to SGSN-V 601, using the HPMN APN with IMSI-V and MSISDN-V as the parameters. Since the HPMN APN is a special APN, the SG 108 stores the mapping of HPMN and VPMN APN. Thereafter, at step 604, SGSN-V 601 applies DNS resolution on this APN (network name associated with this APN is the VPMN), which points the GGSN address as an address of SG 108. Thereafter, SGSN-V 601 sends a create PDP context request to SG 108 as it acts as the GGSN-V. Since the HPMN profile is activated for GPRS, at step 606, SG 108 applies DNS on the APN to get address of GGSN-H 605, and subsequently relays the create PDP context message to GGSN-H 605, by replacing with HPMN IMSI-H and MSISDN-H.

Generally, SGSN-V 601 first establishes a PDP context with SG 108, which then applies DNS resolution on HPMN APN depending on the profile selection to find the corresponding GGSN-H 605. Thereafter, at step 608, GGSN-H 605 acknowledges the message to SG 108. Thereafter, at step 610, SG 108 relays this acknowledgment to SGSN-V 601, which in turn, relays it to subscriber 106's handset, at step 612. At step 614, subscriber 106 sends a GTP PDU back to SGSN-V 601. SGSN-V 601 relays the GTP PDU to SG 108, at step 616. Finally, at step 618, SG 108 relays the GTP PDU to GGSN-H 605.

Figure 7A:
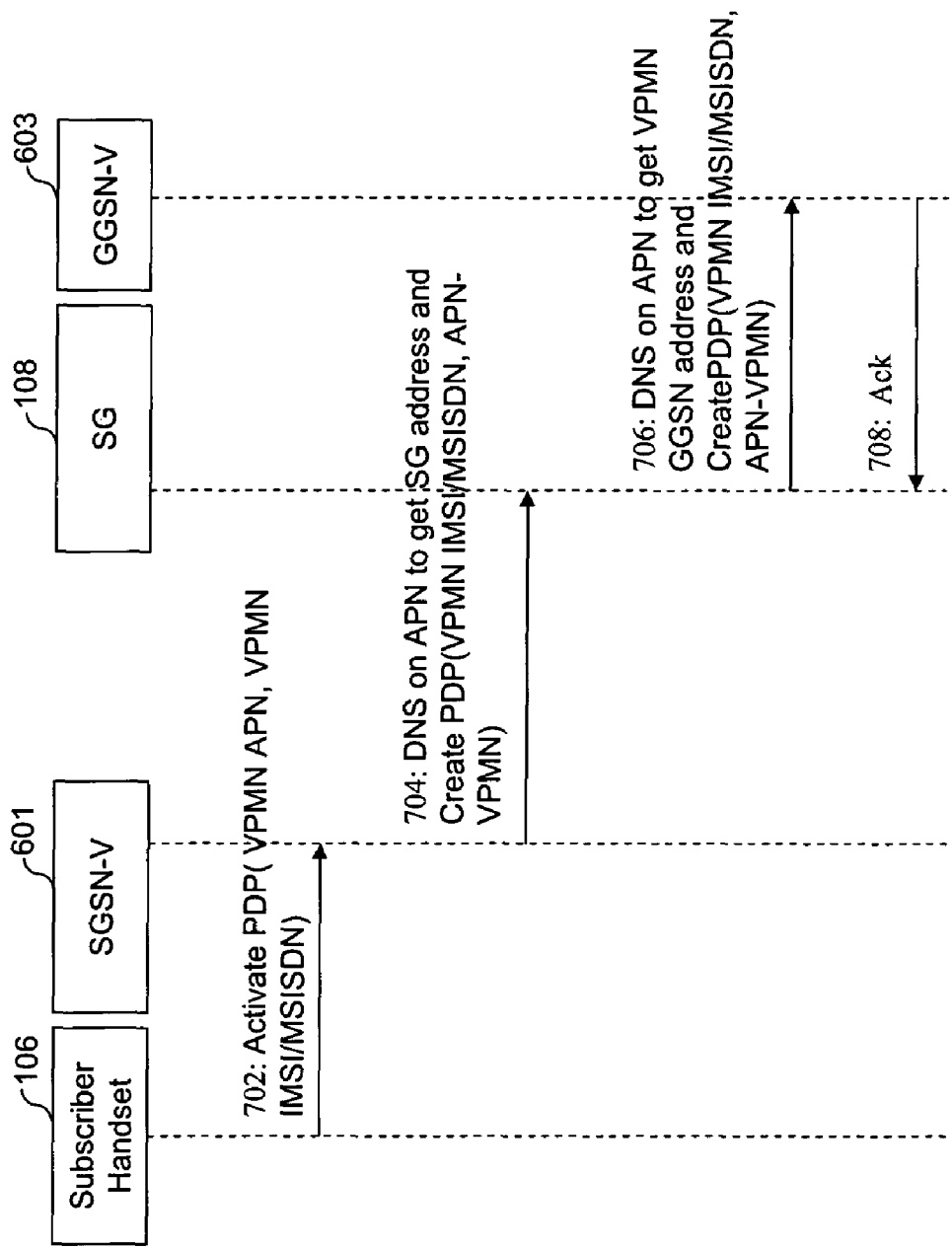
FIGS. 7A and 7B represent a flow diagram for MO GPRS session from the subscriber using VPMN APN, in accordance with an embodiment of the invention.
Figure 7B:
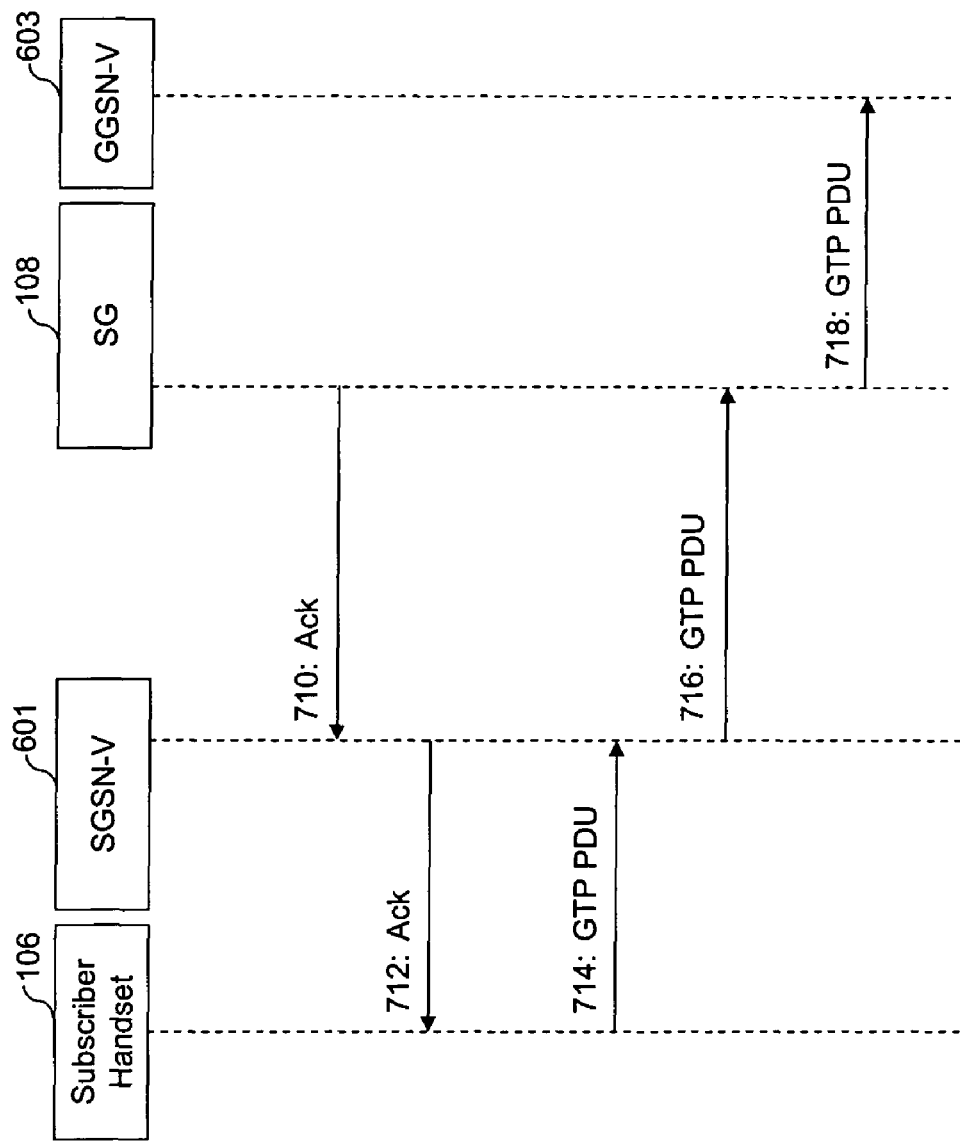

The subscriber can also use GPRS service when his VPMN profile is activated. The call flow for such a case would be similar as explained earlier in FIGS. 6A and 6B, except for a change at step 606. FIGS. 7A and 7B represent a flow diagram for MO GPRS session from the subscriber using VPMN APN, in accordance with an embodiment of the invention. At step 702, subscriber sends an activate PDP context request to SGSN-V 601, using VPMN APN with IMSI-V and MSISDN-V as the parameters. Thereafter, at step 704, SGSN-V 601 applies DNS resolution on the APN to get the address of SG 108, and subsequently, sends a create PDP context to SG 108. Since VPMN profile is activated for subscriber 106, at step 706, SG applies DNS on the APN to get address for GGSN-V 603, and subsequently relays the create PDP context to GGSN-V 603, with VPMN APN and IMSI-V and MSISDN-V as the parameters. Generally, SG 108 establishes PDP context with IMSI-V when GGSN-V is selected, and with IMSI-H when GGSN-H is selected. The IMSI is also correspondingly changed in exchange of GTP PDU. Furthermore, the acknowledgment from GGSN-V 603 is relayed through SG 108 and SGSN-V 601, to finally reach subscriber 106's handset, in steps 708, 710 and 712 respectively. Thereafter, GTP PDU from the subscriber is also relayed through SGSN-V 601 and SG 108 to finally reach GGSN-V 603 in steps 714, 716, and 718, respectively. In another embodiment of the invention, for any APN that is local to VPMN 104, the VPMN DNS resolves to GGSN-V 603 and hence does not involve the use to SG 108. Similarly, for HPMN APN, the VPMN DNS resolution resolves to SG 108, with call flow similar as explained in conjunction with FIGS. 6A and 6B, except that the profile assumes HPMN GPRS for such APN.

Figure 8:
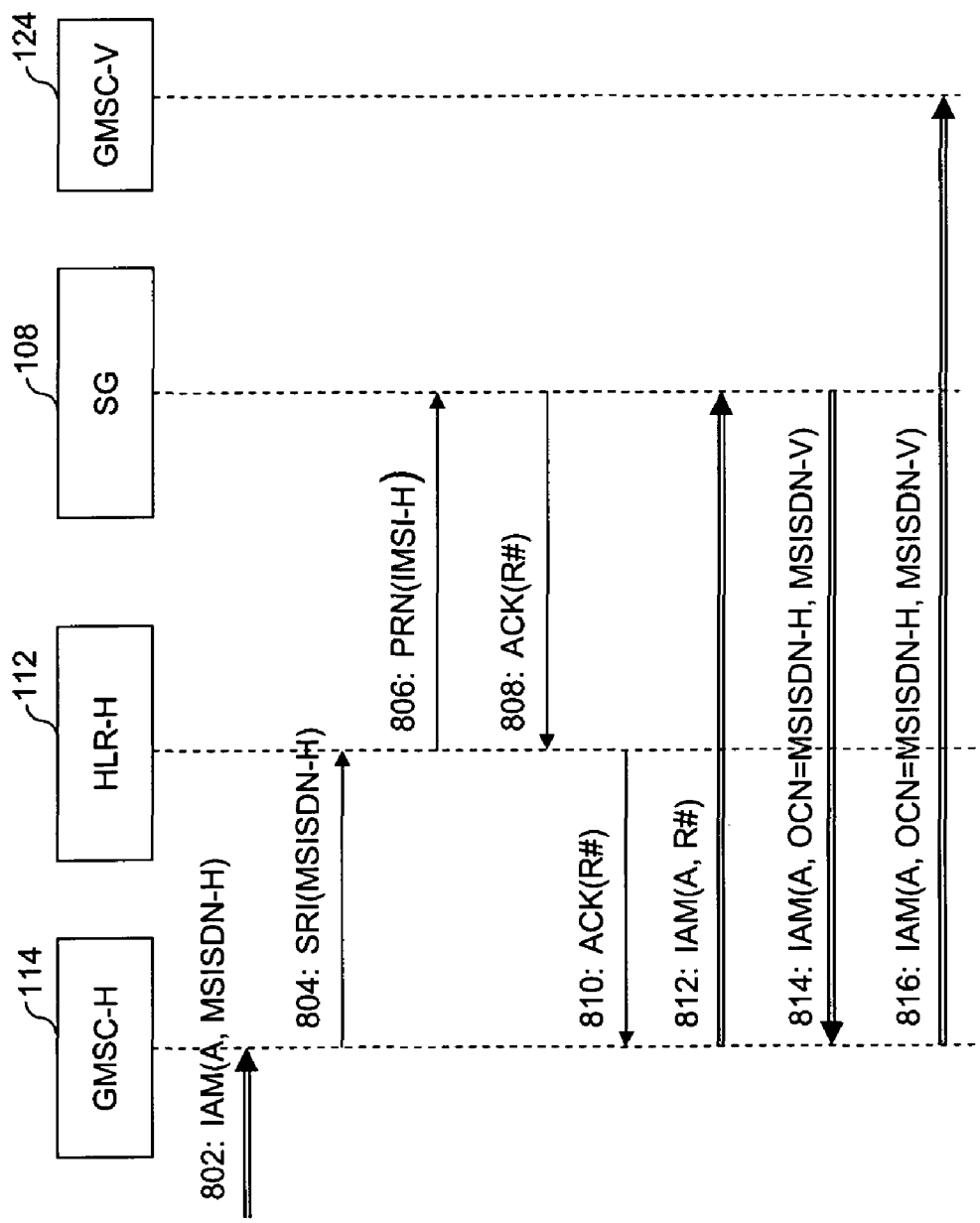
FIG. 8 represents a flow diagram of MT call at HPMN MSISDN of the subscriber, in accordance with an embodiment of the invention.

As explained earlier, a Mobile Terminated (MT) SMS or call on MSISDN-V, is treated as a local SMS and call in VPMN 104, respectively. FIG. 8 represents a flow diagram of MT call at MSISDN-H of the subscriber, in accordance with an embodiment of the invention. A subscriber 'A' calls a subscriber 106 (referred to as 'B'), who has subscribed for the MIMM service. Subscriber A calls subscriber 106 at his HPMN MSISDN. At step 802, a call request like IAM (A, MSISDN-H) reaches GMSC-H 114. At step 804, GMSC-H 114 issues a call routing information query such as SRI (MSISDN-H) to HLR-H 112. Since the VPMN association for subscriber 106 is also active, at step 806, HLR-H 112 issues a provide roaming number query, such as PRN(IMSI-H), to SG 108. Thereafter, at step 808, SG 108 returns a special routing number, such as R#, in its PRN ACK to HLR-H 112. In one embodiment of the invention, this special routing number R# can include a special prefix and subscriber 106's active VPMN number i.e., MSISDN-V. In another embodiment of the invention, the special routing number R# can be a special number in a particular range in HPMN 102. SG 108 also records the assignment of the R# with MSISDN-V.

Thereafter, at step 810, HLR-H 112 returns the PRN ACK with R# to GMSC-H 114. Thereafter, at step 812, GMSC-H 114 continues the call on this R# using IAM(A, R#) to a special switch. In various embodiments of the invention, the special switch can be GMSC-H 114 itself or a VoIP platform having a special routing configuration for R#. The VoIP platform is coupled to HPMN 102. Thereafter, the special switch processes the R# to deduce the final destination number in the following two ways: firstly, the special switch removes the prefix to get MSISDN-V and secondly, the special switch passes the call control for R# to SG 108. Furthermore, at step 814, SG 108 requests GMSC-H 114 (i.e. the special switch) to route the call to MSISDN-V, using IAM(A, OCN=MSISDN-H, MSISDN-V). The signaling in this case can be one of, but may not be limited to, ISUP loopback, IN (INAP), non-standard IN, CAP, WIN and SIP. The insertion of OCN=MSISDN-H in IAM message is optional. Finally at step 816, the GMSC-H 114 routes the call to GMSC-V 124 at MSISDN-V.

Figure 9A:
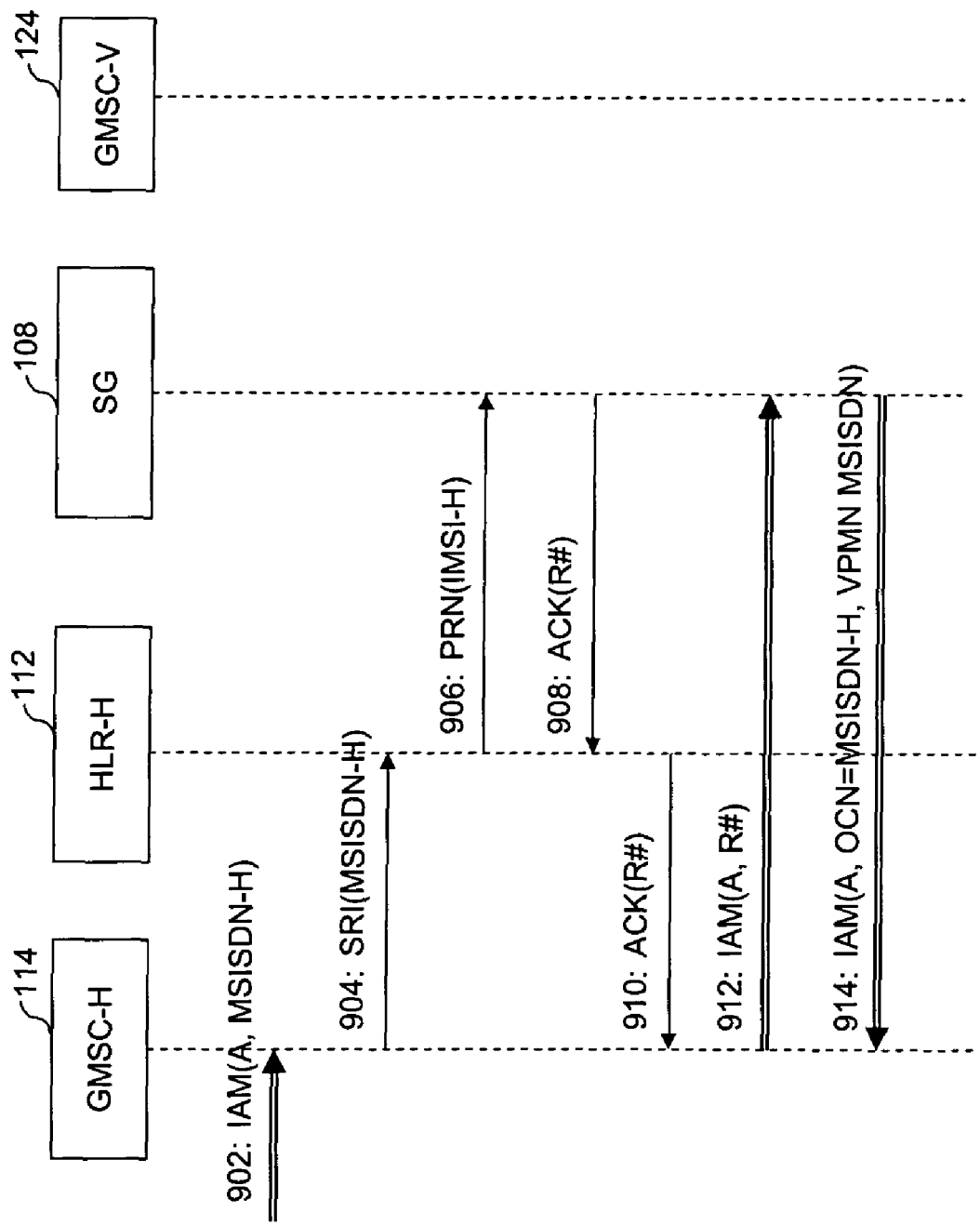
FIGS. 9A and 9B represent a flow diagram of late call forwarding of MT calls at HPMN MSISDN of the subscriber, in accordance with an embodiment of the invention.
Figure 9B:
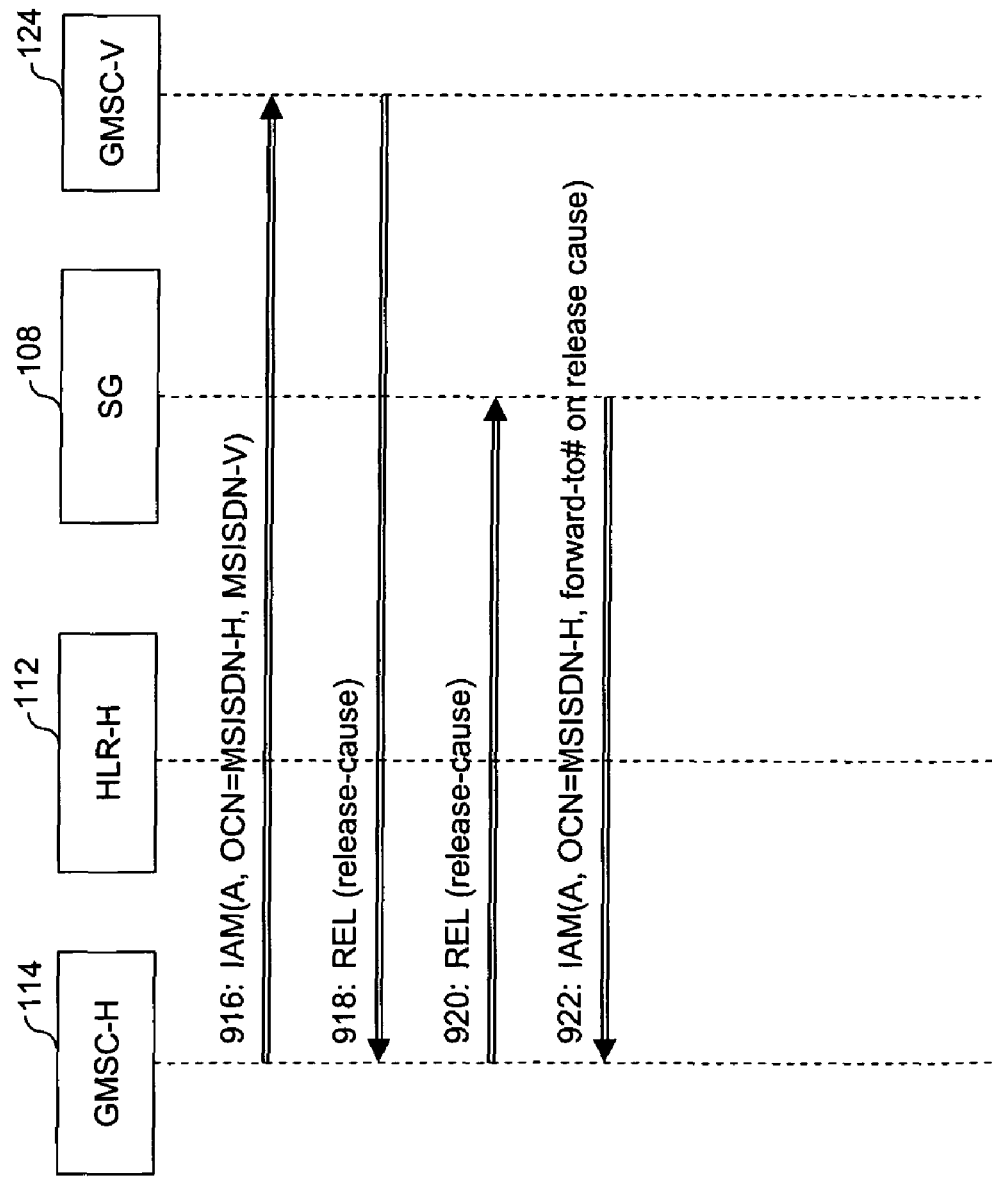

FIGS. 9A and 9B represent a flow diagram of late call forwarding of MT calls at HPMN MSISDN of the subscriber, in accordance with an embodiment of the invention. When the subscriber associates the VPMN MSISDN with HPMN MSISDN, during the location update with HLR-H 112, SG 108 obtains call forwarding information for subscriber 106. However, if the subscriber sets Call Forwarding (CFU) on MSISDN-H, then SG 108 is not involved, as early call forwarding happens. The call flow for late call forwarding in this embodiment is similar to the call flow of MT calls at MSISDN-V, with steps 902 to 916 being identical to steps 802 to 816, respectively. At step 916, GMSC-H 114 routes the call to GMSC-V 124 at MSISDN-V. If call forwarding such as, but not limited to, unconditional, early and late call forwarding, is set at MSISDN-V and call is answered in VPMN 104, SG 108 does not intercept the call control. However, at step 918, GMSC-V 124 releases the call using ISUP release with release cause to GMSC-H 114. At step 920, SG 108 intercepts the release cause to select the corresponding call forwarding number. Finally at step 922, SG 108 issues a call setup IAM (A, OCN=MSISDN-H, forwarding number), based on the release cause. However, if there is no forwarding number, then SG 108 relays the ISUP REL message to GMSC-V 124. Furthermore, if the release cause in ISUP REL message is unknown, SG 108 determines a call forwarding number based on a configuration option such as, but may not be limited to, user busy and user unreachable.

As mentioned in various embodiments of the invention that local profile is maintained for each network IMSI, i.e. IMSI-H or IMSI-V, or likewise, these IMSIs also have corresponding voicemail forwarding number. In one embodiment of the invention, if only HPMN provides voicemail forwarding, then late forwarded calls on any MSISDN (MSISDN-1), irrespective of the subscriber's current location (MSISDN-V), are forwarded to HPMN Voicemail. MSISDN-1 may correspond to a new VPMN-1 other than VPMN 104. Hence, the called MSISDN-1 and the currently registered network VPMN 104 are not corresponding to the same VPMN. For example, if the subscriber is registered at VPMN-1, and he is not answering a call on his MSISDN-H, the call is routed through the SG to the HPMN voicemail. As another example, if the subscriber is registered at VPMN 1, and he is not answering a call to his VPMN 2 MSISDN, the call is again routed through the SG to the HPMN voicemail. However, if the subscriber is registered at VPMN 1 and he is not answering to a call on his VPMN 1 MSISDN, the call is dropped. Further, it will be apparent to a person skilled in the art, that if the subscriber is at HPMN and he is not answering a call on his HPMN MSISDN, then the call is forwarded to his HPMN voicemail. However, in case only VPMN provides a voicemail forwarding, then late call forwarding on the VPMN MSISDN goes to that voicemail. The call is dropped only when the subscriber is registered at VPMN-1, and does not answer the call on MSISDN-1 corresponding to VPMN-1.

A local SMSC, corresponding to the subscriber's location, notifies whenever a voicemail is left for the subscriber. In another instance, the voicemail for the subscriber may be left at a network that is different from his current registered location. The voicemail notification (MT-SMS) message goes through the SG where the SG checks the message whether the sender is from a voicemail system. If it is, then the SG precedes the voicemail notification with an SMS of its own, which informs the subscriber for the network from which the next voice mail notification comes. Hence, the subscriber is able choose the correct IMSI and profile to check his voicemail.

In an embodiment of the invention, the subscriber dials in to the voicemail system to check his voicemail. In the case of multiple VPMN SIMs approach, since the voicemail number is stored in the SIM, the subscriber can press "1" on the keypad to check the voicemail. In case of multiple IMSI in single SIM approach, in the case of multi-IMSI STK-based SIM approach, the STK application can swap in the corresponding voicemail number on a selected IMSI in the SIM, and the subscriber can still press "1" on the keypad to check the corresponding voice mail.

Figure 10:
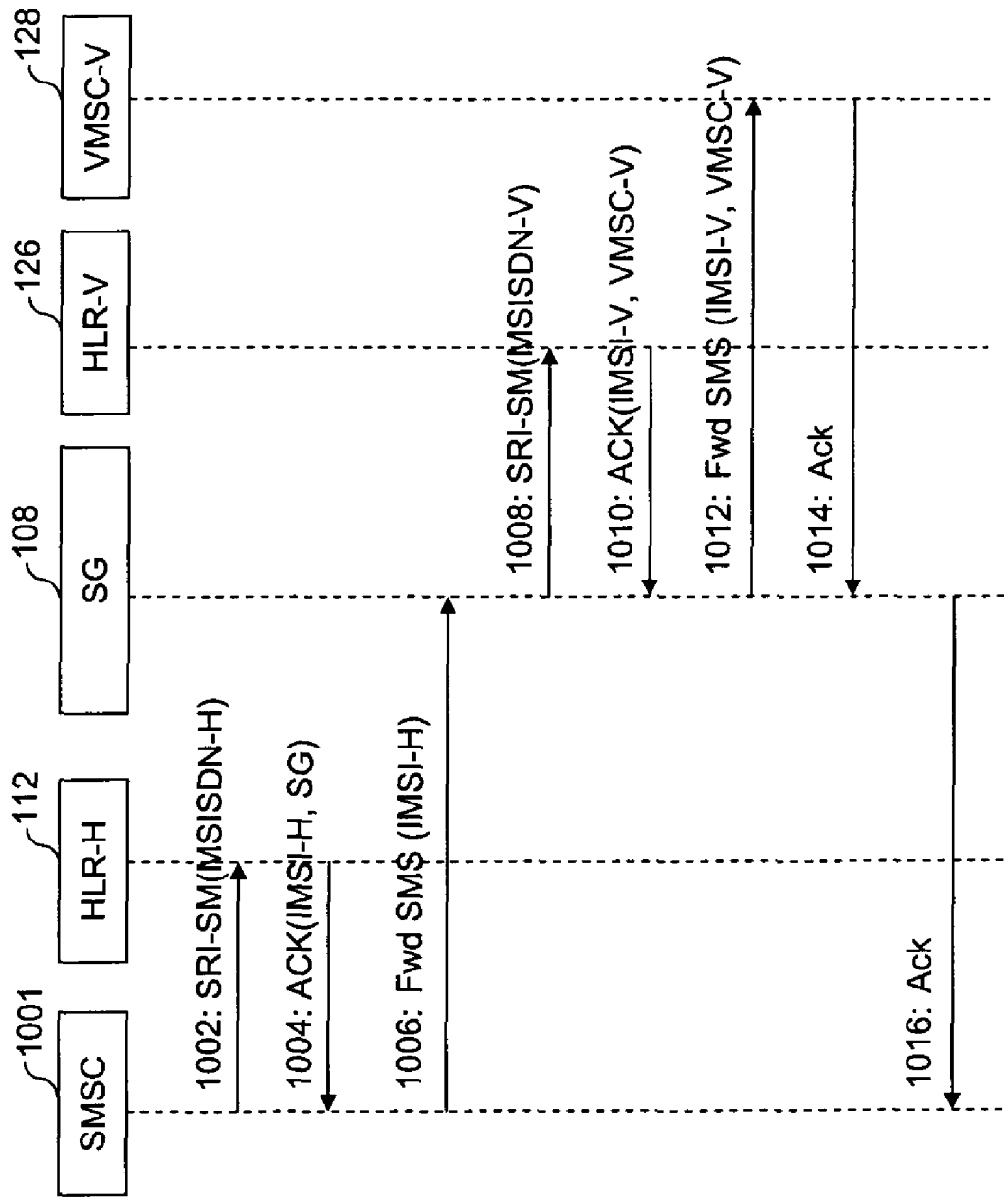
FIG. 10 represents a flow diagram of MT SMS at HPMN MSISDN of the subscriber, in accordance with an embodiment of the invention.

FIG. 10 represents a flow diagram of MT SMS at HPMN MSISDN of the subscriber, in accordance with an embodiment of the invention. The SMS is present at an originating SMSC 1001. At step 1002, SMSC 1001 issues a routing query for SMS like SRI-SM(MSISDN-H) to HLR-H 112. Since subscriber 106 has subscribed to the MIMM service, there is an association between MSISDN-H and MSISDN-V. Hence, at step 1004, HLR-H 112 returns the address of SG 108 as SRI-SM ACK. Thereafter, at step 1006, originating SMSC 1001 forwards the SMS on MSISDN-H to SG 108. Thereafter, at step 1008, SG 108 replaces MSISDN-H with MSISDN-V in SRI-SM message and sends it to HLR-V 126. In another embodiment of the invention, SG 108 sends the SMS over IP to a SMS inter-working service provider, such as Mobile 365, which delivers the SMS to its destination. Thereafter, at step 1010, HLR-V 126 returns an address of VMSC-V 128 as its acknowledgment to SRI-SM. At step 1012, SG 108 forwards the SMS to VMSC-V 128. The acknowledgement, including errors, is returned to SG 108 at step 1014. Finally, at step 1016, SG 108 relays the acknowledgment back to originating SMSC 1001.

Figure 11:
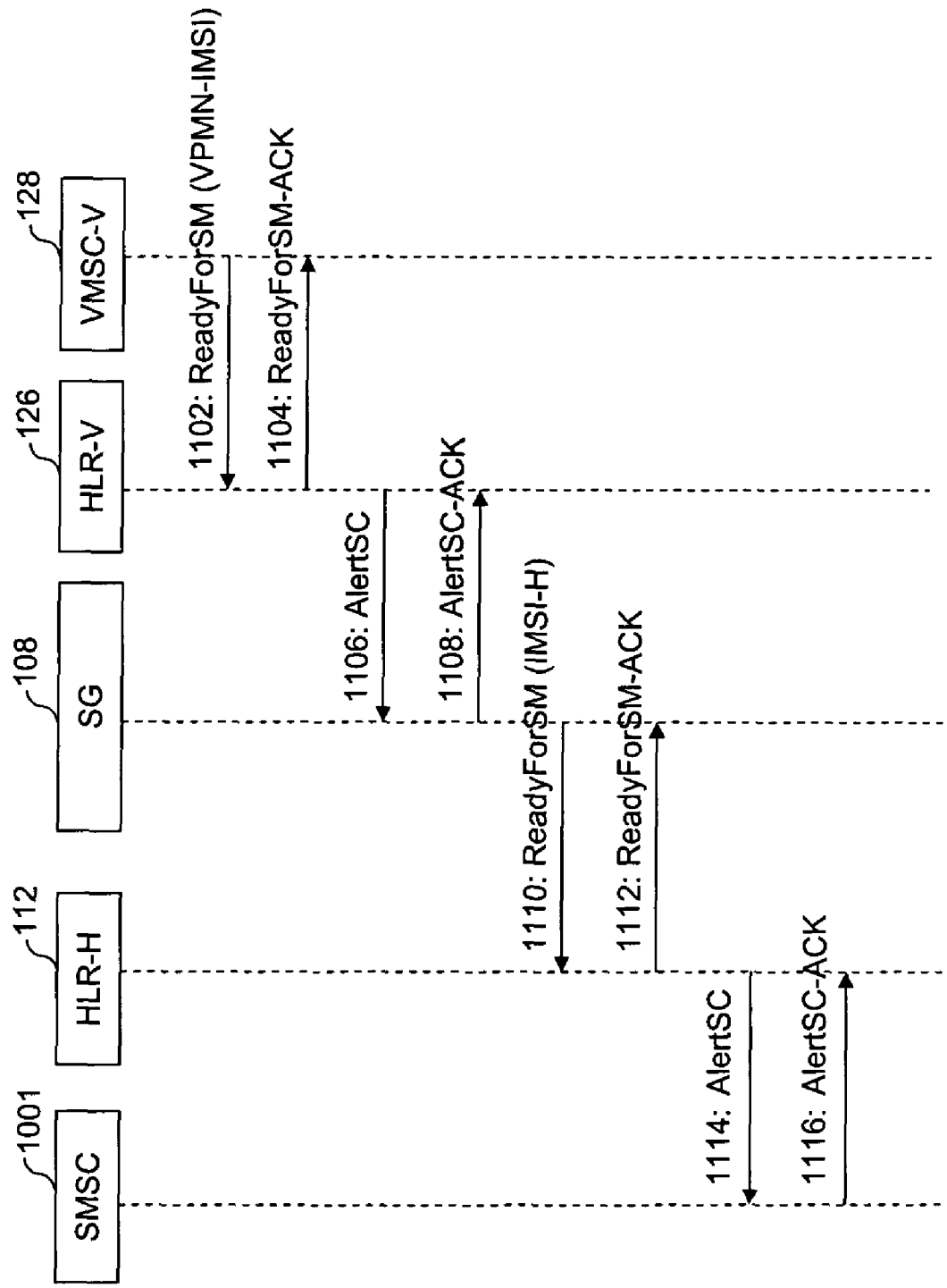
FIG. 11 represents a flow diagram for re-delivery of MT SMS at HPMN MSISDN of the subscriber, in accordance with an embodiment of the invention.

In an embodiment of the invention, the MT-SMS may not be delivered to subscriber 106's handset because the handset may be switched off, or could be out of coverage area, or the inbox of the handset could be full. FIG. 11 represents a flow diagram for re-delivery of MT SMS at HPMN MSISDN of the subscriber, in accordance with an embodiment of the invention. In such a case, the originating SMSC 1001 sends a REPORT SM DELIVERY STATUS message to HLR-H 112, to set the Message Waiting Data flag into the HLR-H 112, for subscriber 106, after MT FSM ACK. Since REPORT SM DELIVERY STATUS message is like SRI and SRI-SM message and is based on MSISDN, this message is not intercepted by SG 108. Since SG 108 acts like an SMSC to forward the MT SMS to MSISDN-V, SG 108 also sends a REPORT SM DELIVERY STATUS message to HLR-V 126 of MSISDN-V, to set the Message Waiting Data flag in HLR-V 126, for subscriber 106, after receiving MT FSM ACK. Simultaneously, since VMSC-V 128 is aware that the MT-SMS is not delivered to subscriber 106, it sets the Message Waiting Data flag in the VPMN VLR also.

When VMSC-V 128 makes radio contact with subscriber 106's handset when the handset is switched on, or comes in coverage area, or subscriber 106 deletes one or more messages from his inbox, the VMSC-V 128, at step 1102, sends the READY FOR SM message to HLR-V 126 of VPMN 104. At step 1104, HLR-V 128 sends the acknowledgement to VMSC-V 128. Since SG 108 is registered for notification on MSISDN-V, at step 1106, HLR-V 126 sends AlertSC to SG 108. Thereafter, at step 1108, SG 108 sends an AlertSC ACK to HLR-V 128 of MSISDN-V. Thereafter, at step 1110, SG 108 issues a ReadyForSM to HLR-H 112 for IMSI-H. Thereafter, at step 1112, SG 108 receives an acknowledgment for the ReadyForSMS message from HLR-H 112. Hence, at step 1114, HLR-H 112 sends AlertSC to originating SMSC 1001. Finally, at step 1116, originating SMSC 1001 sends back the acknowledgment to AlertSC to start the original SMS re-delivery.

Figure 12:
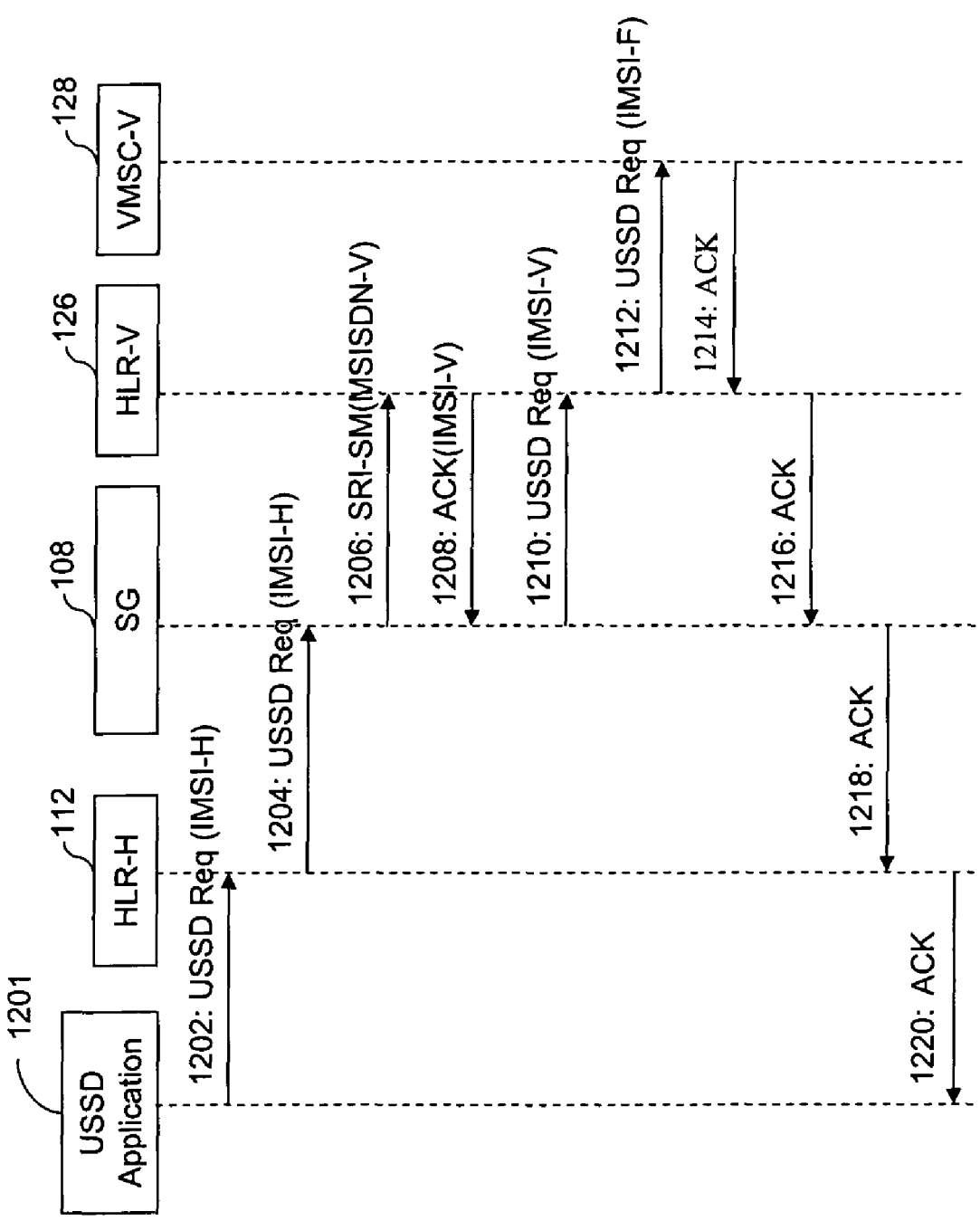
FIG. 12 represents a flow diagram of MT USSD at HPMN MSISDN of the subscriber, in accordance with an embodiment of the invention.

It will be apparent to a person skilled in the art that a call flow similar to MT SMS is applicable for MT-USSD or other supplementary services. FIG. 12 represents a flow diagram of MT USSD at HPMN MSISDN of the subscriber, in accordance with an embodiment of the invention. A USSD application 1201, such as GSM SCF, sends a USSD request (USSD Req) on IMSI-H to HLR-H 112, at step 1202. At step 1204, HLR-H 112 sends the USSD Req (IMSI-H) to SG 108 with CdPA SSN=7. The SSN=7 denotes called party is VLR. Thereafter, at step 1206, SG 108 retrieves IMSI-V from HLR-V 126, by issuing SRI-SM on MSISDN-F. At step 1208, HLR-V 126 returns IMSI-V in the acknowledgment to SG 108. Thereafter at step 1210, SG 108 sends USSD Req(IMSI-V) to HLR-V 126. Furthermore, at step 1212, HLR-V 126 sends the USSD Req(IMSI-V) to VMSC-V 128, with CdPA SSN=7, to signify destination as VLR-V 130. Thereafter, at step 1214, VMSC-V 128, coupled with VLR-V 130, sends the acknowledgment to HLR-V 126. The acknowledgment is relayed through SG 108, HLR-H 112 and finally to USSD application 1201, in steps 1216, 1218, and 1220, respectively.

Figure 13:
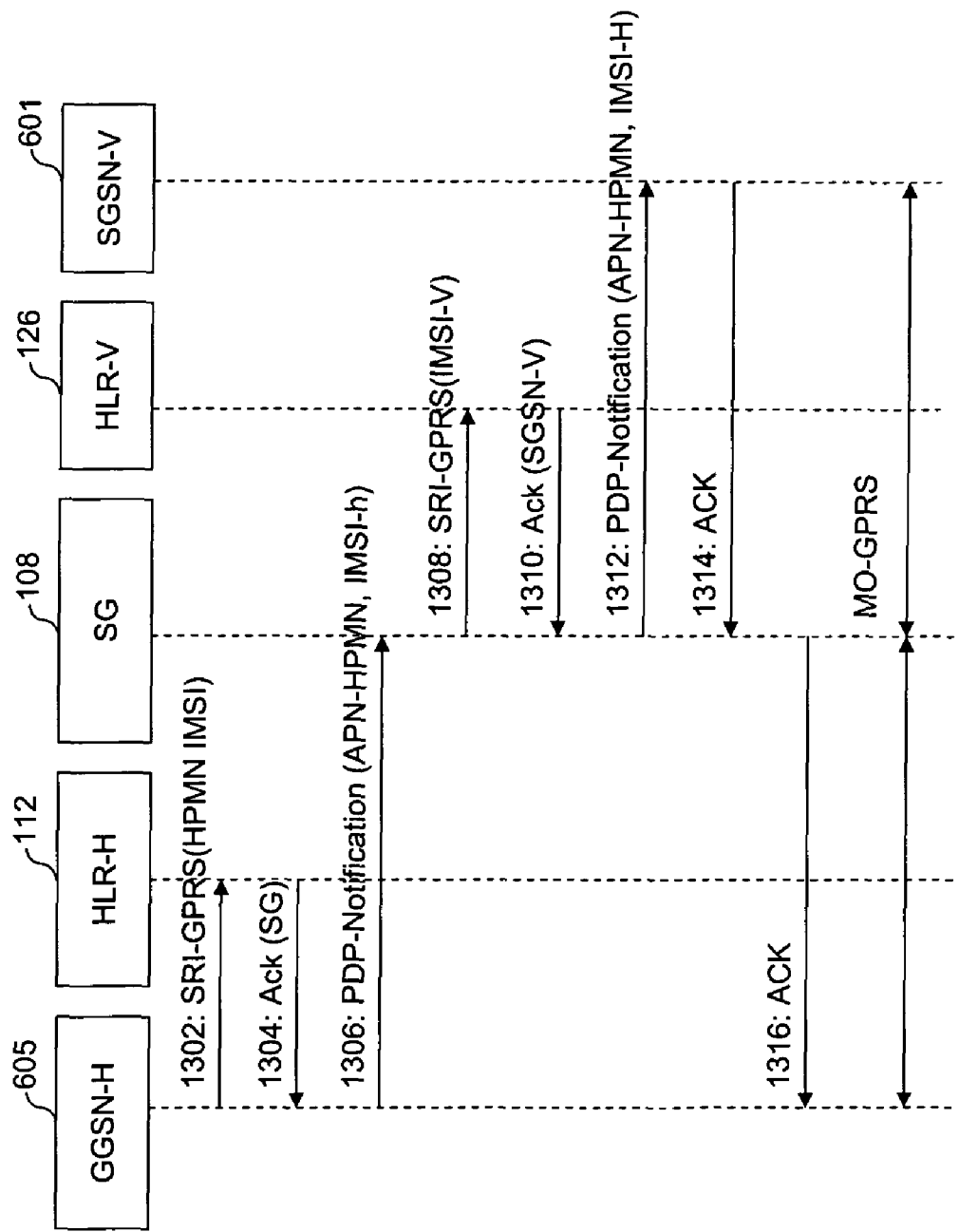
FIG. 13 represents a flow diagram MT GPRS session at HPMN MSISDN of the subscriber, in accordance with an embodiment of the invention.

Similar to MT calls and SMS, subscriber is also able to receive GPRS services on his HPMN MSISDN. It will be apparent to a person skilled in the art that MT GPRS services on VPMN MSISDN does not involve SG 108. As explained earlier in conjunction with FIGS. 6A and 6B for MO-GPRS on HPMN APN, the call flow for MT GPRS on HPMN MSISDN is similar until SG 108 identifies the HPMN APN. FIG. 13 represents a flow diagram MT GPRS session at HPMN MSISDN of the subscriber, in accordance with an embodiment of the invention. In this embodiment, the subscriber, using a VPMN SIM, sends an SMS to long number and an SME to indicate MT GPRS service request at HPMN 102. Hence, at step 1302, GGSN-H 605 sends a routing query for GPRS, such as SRI-GPRS in IMSI-H to HLR-H 112. HLR-112 sends the address of SG 108 at step 1304. At step 1306, GGSN-H 605 sends a PDP Notification on HPMN APN and IMSI-H to SG 108. Thereafter, at step 1308, SG 108 sends SRI-GPRS on IMSI-V to HLR-V 126, corresponding to the received PDP Notification on IMSI-H. At step 1310, HLR-V 126 returns the address of SGSN-V 601 in the acknowledgment. Thereafter, at step 1312, SG 108 relays the PDP Notification on HPMN APN with IMSI-H to SGSN-V 601. SGSN-V 601 sends the acknowledgment back to SG, at step 1314. SG 108 relays the acknowledgment to GGSN-H 605, at step 1316. Subsequent PDP context is established on HPMN APN as explained earlier in conjunction with FIGS. 6A and 6B.

It will be apparent to a person skilled in the art that similar to MT GPRS service, the subscriber is also able to receive a MT MMS as his associated MSISDNs. When a MMS is sent to the subscriber's MSISDN-V, it will reach the subscriber's VPMN MMSC. Thereafter, the VPMN MMSC will send out a MMS alert to the MSISDN-V. The MMS is essentially delivered as an SMS (or WAP push over SMS bearer channel) to the subscriber's handset registered with VPMN 104 with a VPMN SIM. However, if the subscriber's handset is configured to have the VPMN-APN, MMSC address and WAP Gateway, he is able to use GPRS network of VPMN 104 and VPMN WAP Gateway to pull the MMS message from the VPMN MMSC. Furthermore, the subscriber can benefit from the local rates of VPMN. However, if the subscriber's handset is configured to have the HPMN APN, MMSC address and WAP Gateway, then the MMS alert acknowledgment fails. Subsequently, the subscriber is prompted to select the VPMN configuration to retrieve the MMS message.

Alternately, when a MMS is sent to the subscriber's MSISDN-H, the MMS message reaches the HPMN MMSC. Thereafter, HPMN MMSC sends out a MMS alert to the MSISDN-H. The MMS is delivered as an SMS (or WAP push over SMS bearer channel) to the subscriber's handset. However, if the subscriber's handset is configured to have the HPMN APN, MMSC address and WAP Gateway, then the subscriber's handset will be able to use the VPMN GPRS Roaming and HPMN WAP Gateway to pull the MMS message from the HPMN MMSC. However, if the subscriber's handset is configured to have the VPMN APN, MMSC address and WAP Gateway, then the MMS alert acknowledgment fails. Subsequently, the subscriber is prompted to select the HPMN configuration to retrieve the MMS message.

Figure 14A:
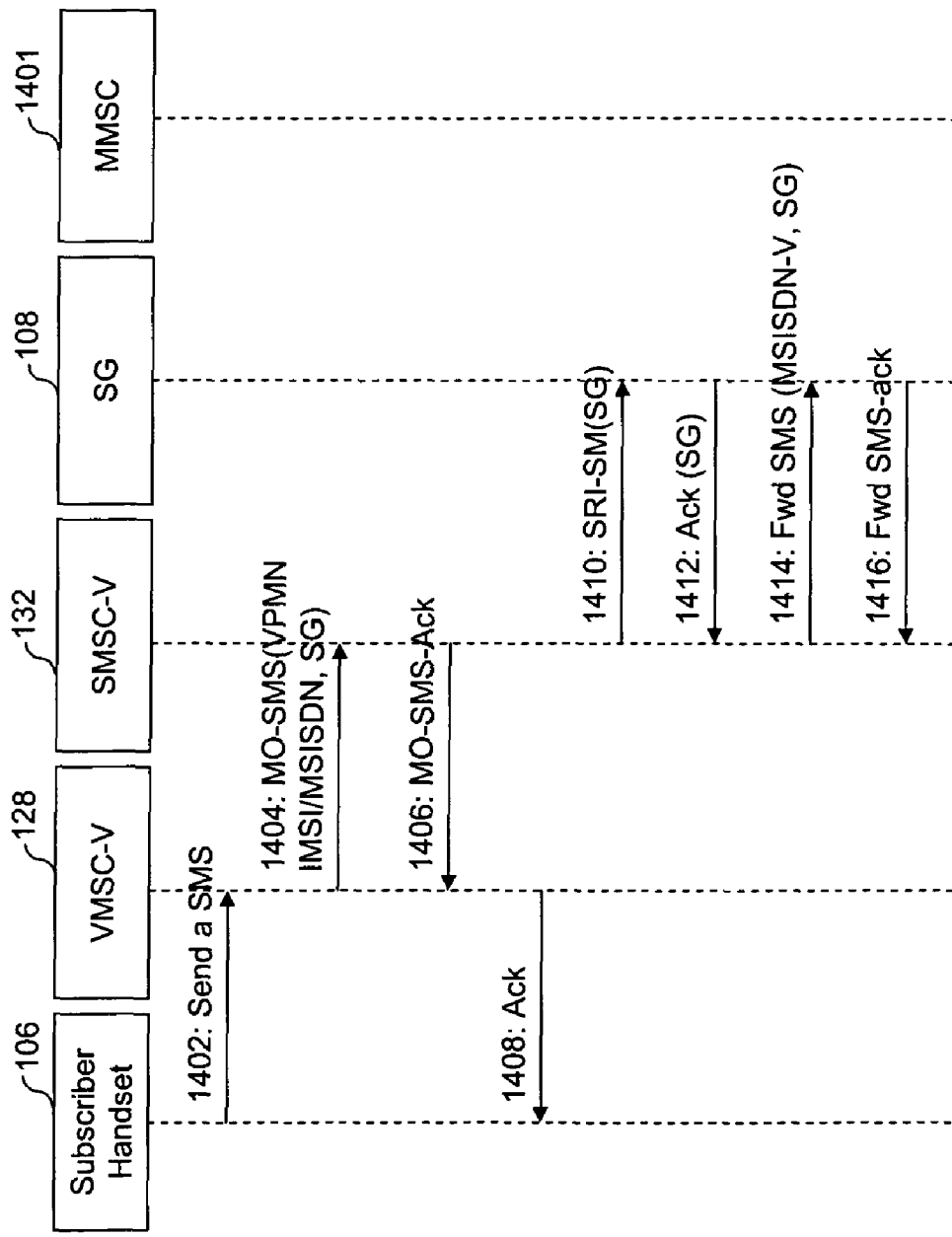
FIGS. 14A and 14B represent a flow diagram for setting MMS forwarding to at a non-registered MSISDN to forward the MMS to a registered MSISDN of the subscriber, in accordance with an embodiment of the invention.
Figure 14B:
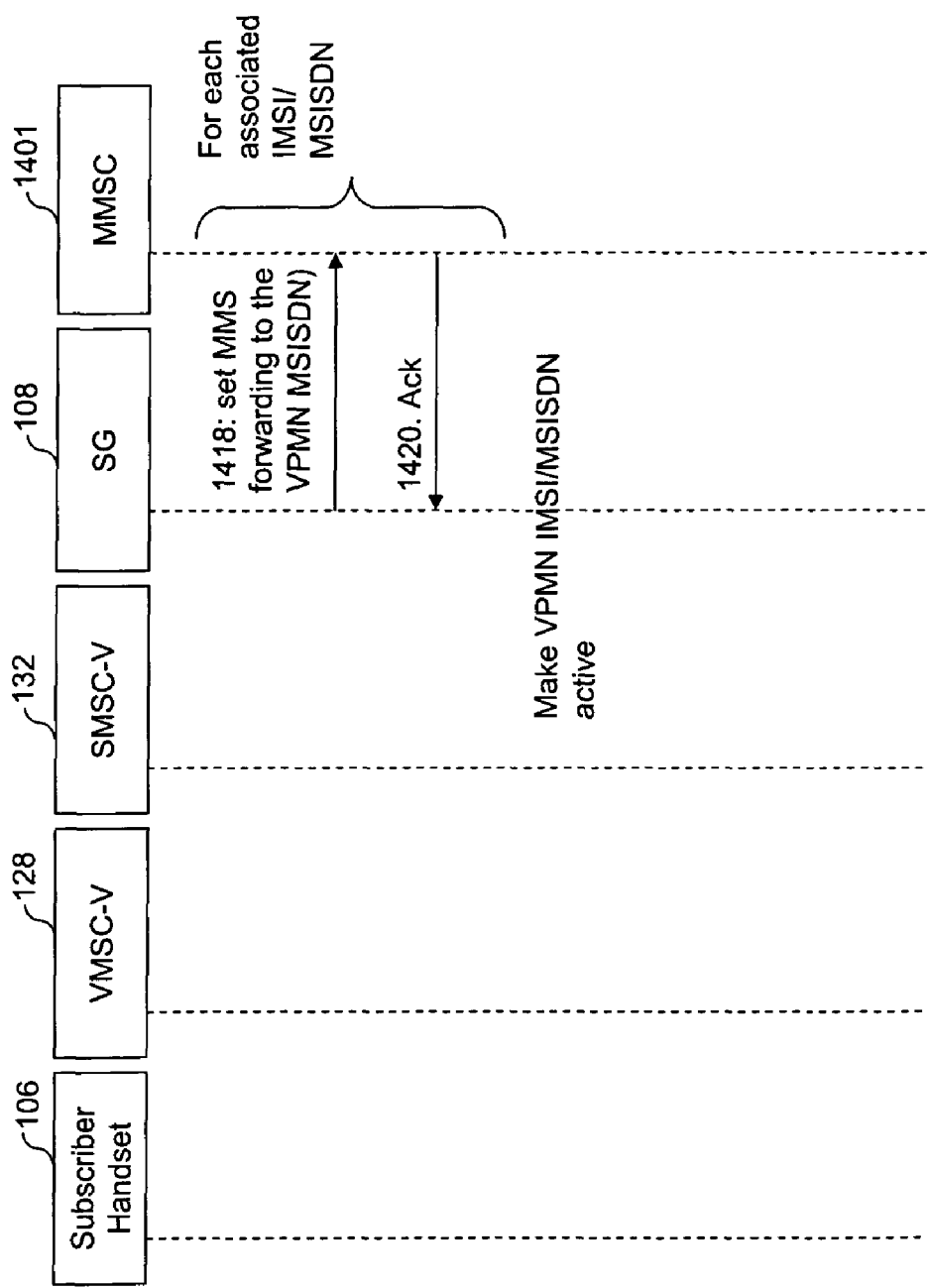

In an alternate embodiment, SG 108 uses MM3 or MM7 interface to set MMS forwarding from MSISDN-H to MSISDN-V. Hence, MMS sent to the MMSC corresponding to MSISDN-H is forwarded to the MMSC corresponding to MSISDN-V via MM4 interface, like MMS inter-working. However, there may be an instance when an MMS is sent to a non-registered (associated) MSISDN of the subscriber. FIGS. 14A and 14B represent a flow diagram for setting MMS forwarding to a non-registered MSISDN, to forward the MMS to a registered MSISDN of the subscriber, in accordance with an embodiment of the invention. Since an MMS is handled by an MMSC in the network, this embodiment includes an MMSC 1401, which possesses the MMS, and is present in the non-registered network. At step 1402, subscriber 106, registered at VPMN 104, sends an SMS to VMSC-V 128. At step 1404, VSMC-V 128 forwards the SMS to SMSC-V 132 (with IMSI-V and MSISDN-V), which is destined for SG 108 as HPMN SME address. SMSC-V 132 returns an acknowledgment to VMSC-V 128, at step 1406. At step 1408, VMSC-V 128 relays that acknowledgement to subscriber 106's handset. Thereafter, at step 1410, SMSC-V 132 sends a SRI-SM routing query to SG 108. SG 108 returns an acknowledgment to SMSC-V 132 with address of SG 108, at step 1412. Thereafter, at step 1414, SMSC-V 132 forwards the SMS with MSISDN-V to SG 108. SG 108, at step 1416, returns the corresponding acknowledgment. Thereafter, at step 1418, SG 108 sets MMS forwarding at MMSC 1401 to MSISDN-V. MMSC 1401 acknowledges the same, at step 1420. The process steps 1418 and 1420 are repeated for each associated IMSI to set forwarding at corresponding MSISDN.

Figure 15A:
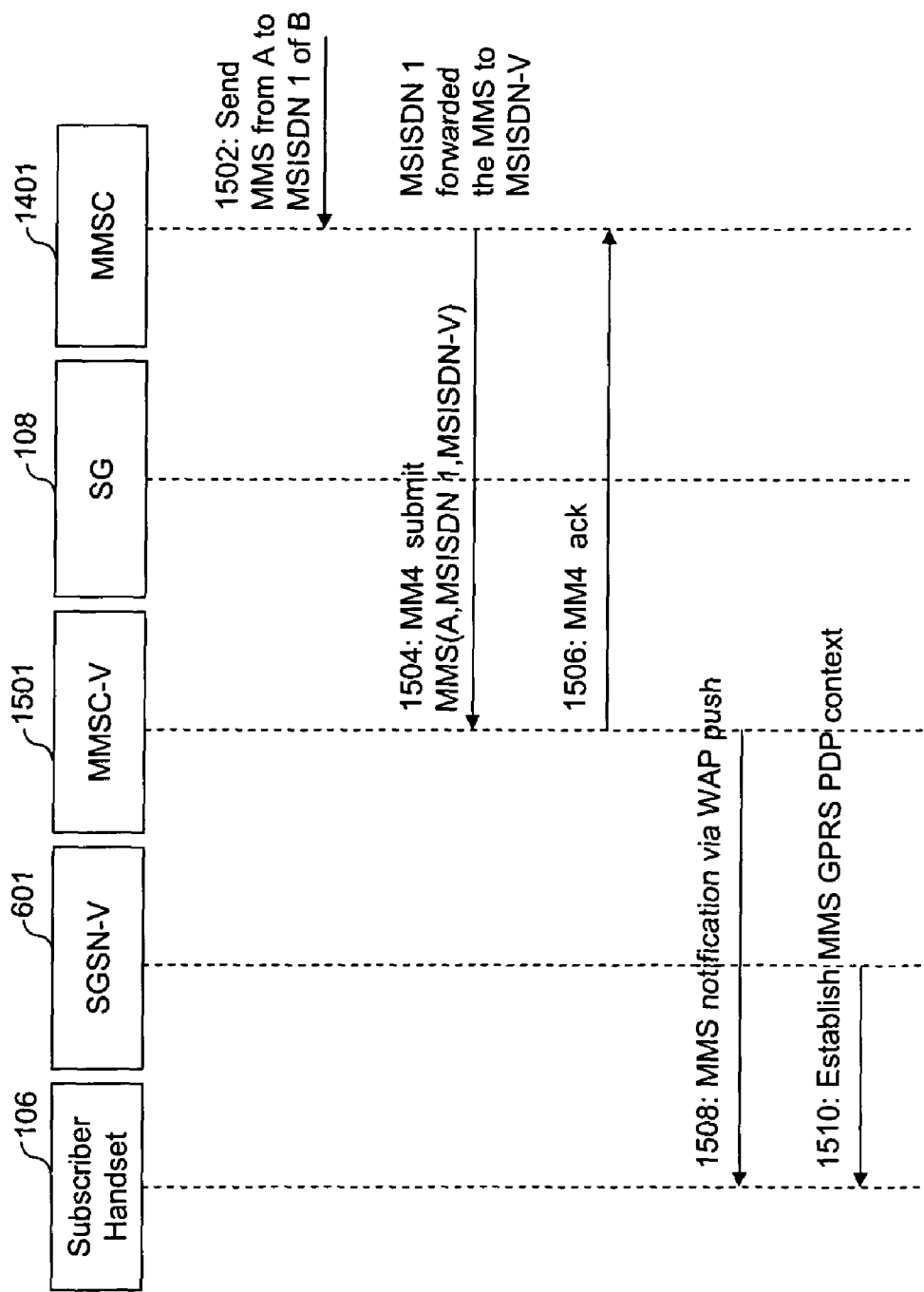
FIGS. 15A and 15B represent a flow diagram of forwarding an MMS received at the non-registered MSISDN to the registered MSISDN of the subscriber, in accordance with an embodiment of the invention.
Figure 15B:
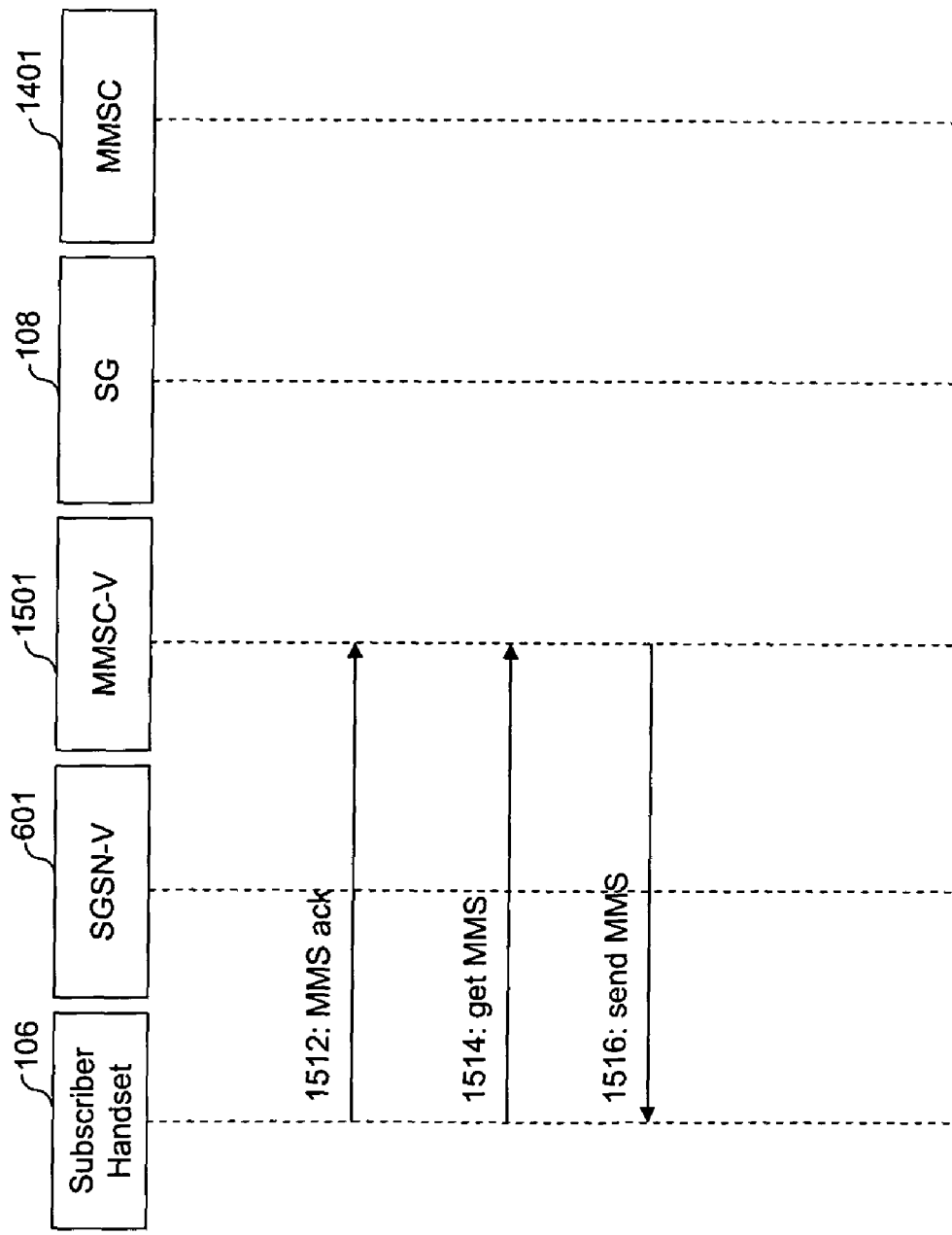

FIGS. 15A and 15B represent a flow diagram of forwarding the MMS received at the non-registered MSISDN to the registered MSISDN of the subscriber, in accordance with an embodiment of the invention. In order to deliver the MMS to the registered MSISDN of the subscriber in VPMN 104, this embodiment includes an MMSC-V 1501, which is present in a registered network for subscriber 106. In an embodiment of the invention, MMSC-V 1501 is present in VPMN 104 where the subscriber is already registered with MSISDN-V. At step 1502, the unregistered MMSC 1401 gets an MMS from a subscriber A, intended for unregistered MSISDN-1 of subscriber 106 (i.e. B). At step 1504, MMSC 1401 forwards the MMS via MMS inter-working to the registered MMSC 1501. In one embodiment of the invention, MMSC 1401 uses MM4 submit message to forward the MMS to registered MMSC-V 1501. At step 1506, MMSC-V 1501 returns an MM4 acknowledgment. Thereafter, at step 1508, MMSC-V 1501 alerts subscriber 106 for MMS notification via WAP push on his handset. Subsequently, SGSN-V 601 establishes a MMS GPRS PDP context to the handset, at step 1510. At step 1512, subscriber 106's handset sends MMS ACK to MMSC-V 1501. Thereafter, at step 1514, subscriber 106 sends a get MMS request to MMSC-V 1501. Finally, at step 1516, MMSC-V 1501 delivers the MMS to subscriber 106' handset.

Figure 16A:
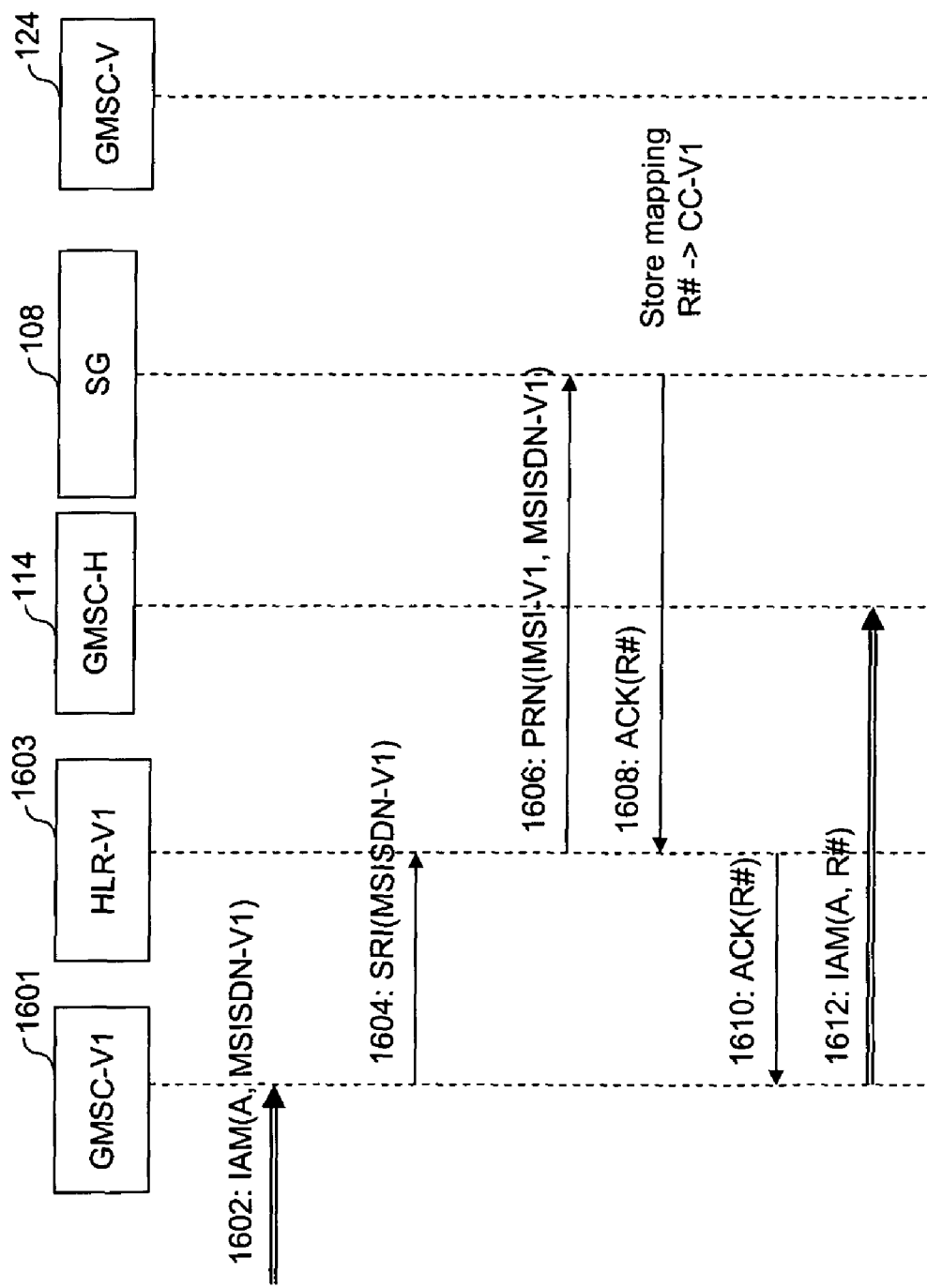
FIGS. 16A and 16B represent a flow diagram of call forwarding of MT call at non-registered VPMN's MSISDN when the subscriber is present in a registered VPMN, in accordance with an embodiment of the invention.
Figure 16B:
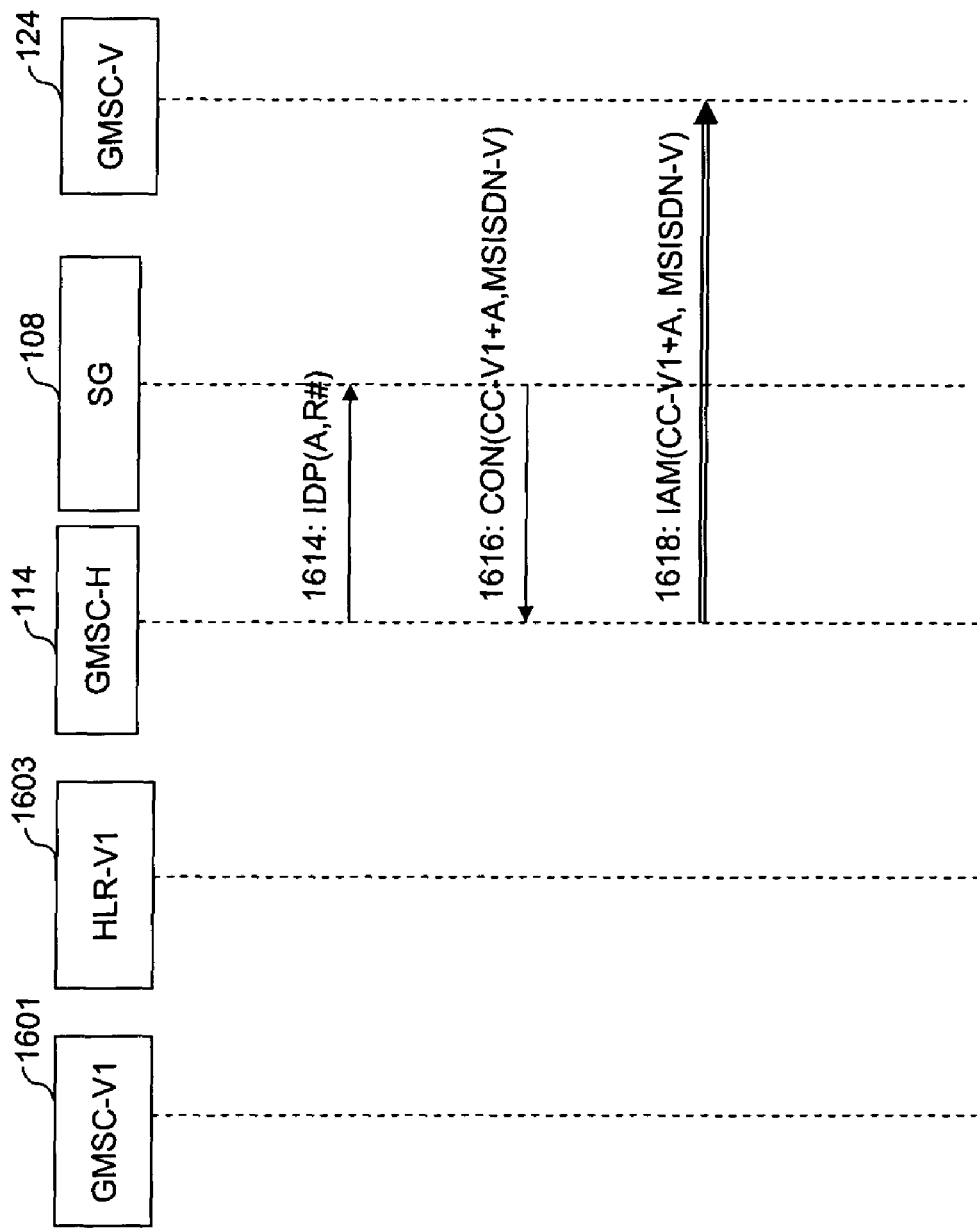

Similar to forwarding the MMS at an un-registered VPMN MSISDN-V1 to a registered VPMN MSISDN-V, MT calls can also be forwarded to the subscriber's current location. FIGS. 16A and 16B represent a flow diagram for forwarding of MT call at the unregistered VPMN's MSISDN-V1, when the subscriber is present in the registered VPMN 104, in accordance with an embodiment of the invention. Since an unregistered VPMN-1 is involved, corresponding network elements like GMSC-V1 1601 and HLR-V1 1603 are used in this embodiment for exemplary purposes. At step 1602, GMSC-V1 1601 receives an IAM(A, MSISDN-V1) for call setup. At step 1604, GMSC-V1 1601 sends a routing information query SRI on the MSISDN-V1 to HLR-V1 1603. Thereafter, at step 1606, HLR-V1 1603 sends a roaming number request PRN on IMSI-V1 and MSISDN-V1 to SG 108. At step 1608, SG 108 returns a special MSRN (R#) from a pool of numbers to HLR-V1 1603. The R# is selected from a pool of numbers that are allocated to SG 108 by HPMN 102. Thereafter, in this instance, GMSC-H 114 is configured to route (via ISUP or IN trigger) the call control corresponding to the special routing number (R#). In one embodiment of the invention, SG 108 stores the mapping of R# and MSISDV-V1. Also, a country code (CC-V1) suffix or prefix may be associated with R#, depending on the country of the unregistered VPMN. The acknowledgement of PRN query is relayed through HLR-V1 to GMSC-V1, at steps 1608 and 1610.

Subsequently, the MT call to MSISDN-V1 is finally routed over the special MSRN R# and reaches GMSC-H 114, at step 1612, as an IAM (A,R#) message. At step 1614, GMSC-H 114 passes the call control using a message such as, but not limited to, IDP (A, R#), to SG 108 via ISUP loopback or an IN trigger. Thereafter, at step 1616, SG 108 swaps in the MSISDN-V with R#, and modifies the caller ID by a suffix or prefix via ISUP loopback or IN Connect such as CON(CC-1+A, MSISDN-V). In an embodiment of the invention, the suffix or prefix is the country code CC-1 corresponding to MSISDN-V1 obtained from the mapping. Finally, at step 1618, GMSC-H 114 initiates the call setup using IAM(CC-1+A, MSISDN-V) to GMSC-V 124. In another embodiment of the invention, caller ID of A is left unchanged, but the called number is sent as out-of-band message such as, but may not be limited to, an SMS, a GPRS push message and instant messaging. However, in such a case, the call is temporarily suspended until the out-of-band SMS is delivered, or timed out, or an error is received.

Other supplementary services like ODB and call barring are also managed, based on local profiles. For example, the subscriber can define, via SS MMI or customer care, to set call barring, call forwarding, or any other SS. This is done like a local subscriber when the subscriber is registered at the VPMN network with the VPMN IMSI, or roaming with the VPMN IMSI/SIM at any other network (VPMN or HPMN). Hence, SS values of different IMSI profiles are independent of each other. For example, if the subscriber sets incoming call barring at the HPMN HLR, when registered at a VPMN with his VPMN IMSI, the incoming call to his VPMN MSISDN may not be barred. Similar is the case for roaming services. As another example, if the subscriber bars his incoming or outgoing calls while roaming at the HPMN HLR, when registered at the VPMN with his VPMN IMSI/SIM, the MO and MT calls to his VPMN MSISDN may not be barred.

Since the local operator providing the service defines ODB, it is tied to an IMSI profile at a network, and is independent of the ODB situation of another IMSI profile at another network. For example, in order to bar an incoming call at a particular MSISDN (HPMN or VPMN), when the subscriber is registered at any other network, with the VPMN IMSI, the subscriber can use the SS call barring of incoming call with the HPMN IMSI registered at the VPMN as a roamer. Alternatively, the subscriber can do the same while he is registers the HPMN with the HPMN IMSI, before he registers with the VPMN network. Any change in the profile subscription of HPMN, by different VPMN networks, requires coordination between the HPMN and the other networks. In one embodiment of the invention, the SG may have OMAP interfaces with each VPMN network to perform the coordination.

As regards the billing for the calls and other VAS of the subscriber, if the HPMN SIM is used, normal roaming billing process applies. However, if a prepaid VPMN SIM is used, the VPMN bills the subscriber via its local prepaid system. The subscriber then pays for the prepaid SIM or recharges the credit in SIM at HPMN or VPMN. Moreover, if a postpaid VPMN SIM is used, the VPMN sends the bill to the HPMN operator, who then bills the subscriber.

It will be apparent to a person skilled in the art, that the MIMM services can also be applied to CDMA/ANSI-41D, and other technologies such as, but may not be limited to, VoIP, WiFi, 2G, 3G, and inter-standard roaming. For example, a CDMA roaming subscriber traveling with a VPMN CDMA handset. Another example is a CDMA roaming subscriber travelling with a VPMN GSM SIM and a GSM handset. Yet another example is a GSM roaming subscriber traveling with a VPMN CDMA RUIM and a CDMA handset. To support these variations, the SG 108 will have a SS7 and network interface corresponding to the VPMN network as well as a SS7 and network interface corresponding to the HPMN network. It would be obvious to a person skilled in the art, that these two interfaces in different directions may not have to be the same technologies. In addition, there could be multiple types of interfaces in both directions.

An exemplary list of the mapping between GSM MAP and ANSI41D is described in the table below as a reference.

| GSM MAP | ANSI 41D |
| --- | --- |
| Location Update/ISD | REGNOT |
| Cancel Location | REGCAN |
| RegisterSS | FEATUREREQUEST |
| InterrogateSS | FEATUREREQUEST |
| SRI-SM | SMSREQ |
| SRI | LOCATION REQUEST |
| ForwardSMS | SMSDPP |
| ReadyForSMS | SMSNOTIFICATION |
| AlertServiceCenter | SMSNOTIFICATION |
| ReportSMSDelivery | SMDPP |
| ProvideRoamingNumber | ROUTING REQUEST |

Figure 17:
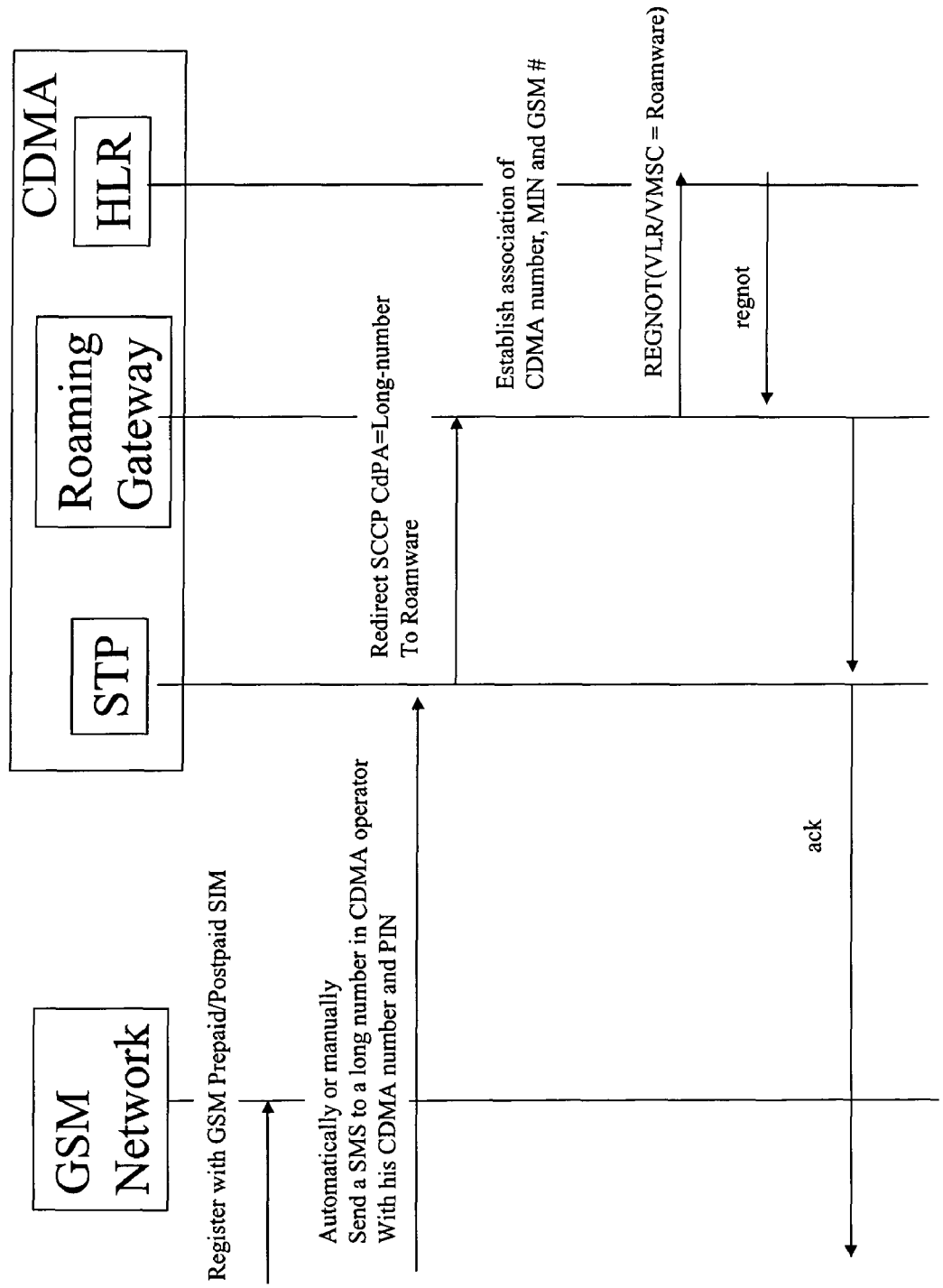
FIG. 17 illustrates an embodiment of the present invention showing a CDMA subscriber using a GSM prepaid/postpaid SIM.
Figure 18:
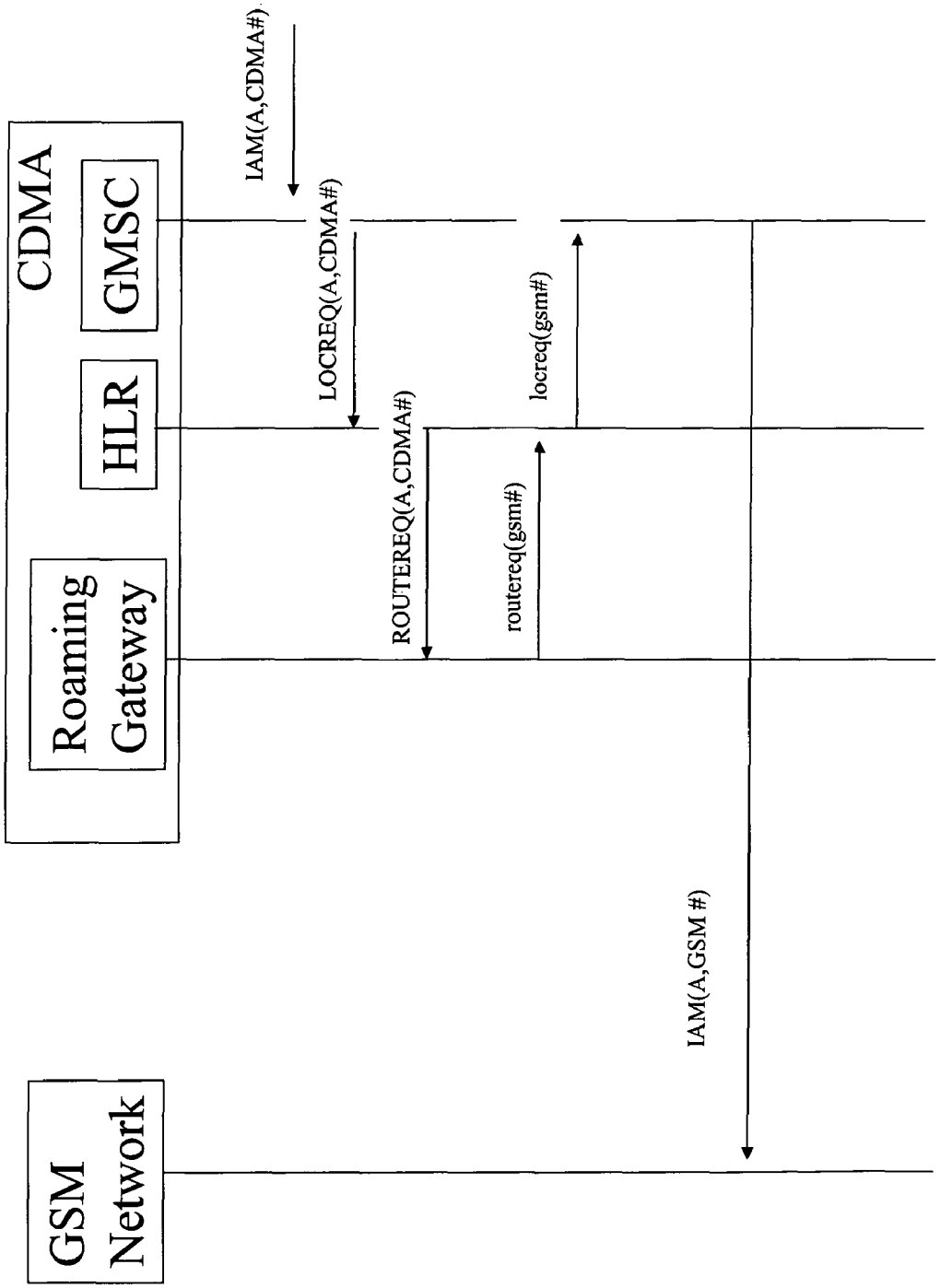
FIG. 18 illustrates an embodiment of the present invention showing receiving a call on CDMA number when a subscriber is registered in a GSM network.
Figure 19:
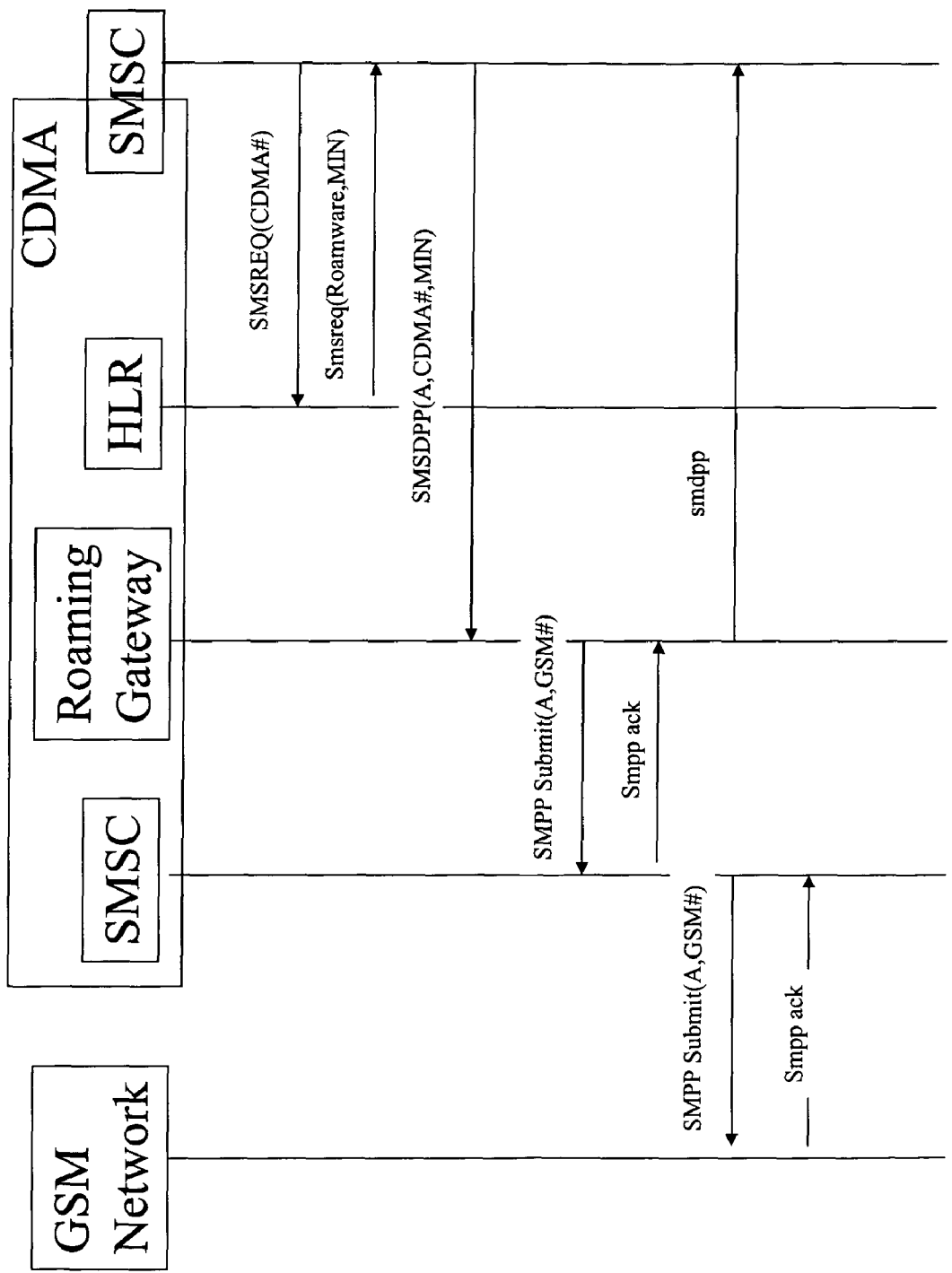
FIG. 19 illustrates an embodiment of the present invention showing a SMS on CDMA number when a subscriber is registered in a GSM network.

FIGS. 17, 18 and 19 illustrate an example where a subscriber of CDMA HPMN operator C subscriber gets a SIM of a GSM operator G (prepaid and postpaid). In this way, the CDMA subscriber can roam (nationally or internationally) in a GSM network with the SIM of the GSM operator G without losing calls and SMS on the phone number of CDMA operator C.

In FIG. 17, the CDMA subscriber obtains a GSM SIM and sends a SMS to a special CDMA long number. The SMS contains the subscriber's CDMA number and PIN. It is assumed that there is SMS interworking between the GSM and CDMA operators. The special CDMA long number is a number assigned by the CDMA operator denoting the Roaming Gateway.

The STP of the CDMA operator redirects the SMS to the Roaming Gateway. The Roaming Gateway then registers its own location as the subscriber's location to the CDMA HLR.

FIG. 18 shows the call flows of incoming calls on the subscriber's CDMA number when the subscriber is registered with a GSM network with the subscriber's GSM SIM. When the CDMA subscriber's phone number is called, the CDMA HLR is queried for the routing number by a GMSC.

The HLR queries the Roaming Gateway for the routing number. The Roaming Gateway can either return the subscriber's GSM number or a virtual routing number of CDMA operator to HLR, which can then return it to the GMSC. The GMSC can then route the call to the subscriber. If the virtual routing number is used, the call signaling will come through the Roaming Gateway, which can then return the real GSM number of the subscriber.

FIG. 19 shows the signal flow of incoming SMS on the subscriber's CDMA number when the subscriber is registered with a GSM network with the subscriber's GSM SIM. When the CDMA subscriber's phone number is SMSed, the CDMA HLR is queried for the VMSC location by a SMSC. The HLR returns the Roaming Gateway address to the SMSC. The SMSC can then forward the SMS to the Roaming Gateway. The Roaming Gateway can then relay the SMS to the GSM number of the subscriber via SMS interworking between the CDMA and the GSM operator.

The present invention can take the form of an entirely hardware embodiment, an entirely software embodiment, or an embodiment containing both hardware and software elements. In accordance with an embodiment of the present invention, software, including but not limited to, firmware, resident software, and microcode, implements the invention.

Furthermore, the invention can take the form of a computer program product, accessible from a computer-usable or computer-readable medium providing program code for use by, or in connection with, a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CDROM), compact disk-read/write (CD-R/W) and Digital Versatile Disk (DVD).

An operator uses the MIMM system to serve subscribers, associated with its network, even when they are not in the coverage of home network and are in VPMN networks. The MIMM system facilitates such subscriber to use local rate dialing benefits even when they are in VPMN networks. The MIMM system provides multiple MSISDNs in either a single SIM or multiple VPMN SIMs. The subscriber may use his existing HPMN SIM and can avail the benefit of local rates when he is in VPMN, by using his VPMN MSISDN. Alternatively, the subscriber may use multiple VPMN SIMs, each having its corresponding MSISDN, so as to enable local rate dialing. In addition, the subscriber can use services corresponding to the local profile in the SIM/IMSI. The MIMM system facilitates subscribers to use call related and value added services at any of the associated MSISDNs. The subscriber can receive calls at his HPMN MSISDN, as well as at his VPMN MSISDN, irrespective of his current location. Furthermore, the subscriber can indicate his desired MSISDN in CLI, when initiating any call or a VAS from the HPMN or VPMN. The MIMM system caters to both post-paid and pre-paid subscribers. Moreover, the MIMM system also facilitates the subscriber to make or receive any call or VAS message at any of his associated MSISDNs, by forwarding the call or VAS message from the number at which it is received, to his desired associated MSISDN.

The components of MIMM system described above include any combination of computing components and devices operating together. The components of the MIMM system can also be components or subsystems within a larger computer system or network. The MIMM system components can also be coupled with any number of other components (not shown), such as other buses, controllers, memory devices, and data input/output devices, in any number of combinations. In addition, any number or combination of other processor-based components may be carrying out the functions of the MIMM system.

It should be noted that the various components disclosed herein may be described using computer aided design tools and/or expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof.

Unless the context clearly requires otherwise, throughout the description and the claims, the words "comprise," "comprising," and the like are to be construed in an inclusive sense as opposed to an exclusive or exhaustive sense; that is to say, in a sense of "including, but may not be limited to." Words using the singular or plural number also include the plural or singular number respectively. Additionally, the words "herein,""hereunder," "above," "below," and words of similar import refer to this application as a whole and not to any particular portions of this application. When the word "or" is used in reference to a list of two or more items, it covers all of the following interpretations: any of the items in the list, all of the items in the list and any combination of the items in the list.

The above description of illustrated embodiments of the MIMM system is not intended to be exhaustive or to limit the MIMM system to the precise form disclosed. While specific embodiments of, and examples for, the MIMM system are described herein for illustrative purposes, various equivalent modifications are possible within the scope of the MIMM system, as those skilled in the art will recognize. The teachings of the MIMM system provided herein can be applied to other processing systems and methods. They may not be limited to the systems and methods described above.

The elements and acts of the various embodiments described above can be combined to provide further embodiments. These and other changes can be made in light of the above detailed description.

Other Variations

In describing certain embodiments of the MIMM system under the present invention, this specification follows the path of a telecommunications call, from a calling party to a called party. For the avoidance of doubt, that call can be for a normal voice call, in which the subscriber telecommunications equipment is also capable of visual, audiovisual or motion-picture display. Alternatively, those devices or calls can be for text, video, pictures or other communicated data.

In the foregoing specification, specific embodiments of the present invention have been described. However, one of ordinary skill in the art will appreciate that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

Appendix

APPENDIX

| Acronym | Description |
|---|---|
| 3G | Third generation of mobile |
| BSC | Base Station Controller |
| BCSM | Basic Call State Model |
| CAMEL | Customized Application for Mobile Enhanced Logic |
| CDMA | Code Division Multiplexed Access |
| CLI | Calling Line Identification |
| CgPA | Calling Party Address |
| CdPA | Called Party Address |
| CAP | Camel Application Part |
| CC | Country Code |
| CB | Call Barring |
| CSI | Camel Subscription Information |
| DPC | Destination Point Code |
| DNS | Domain Name System |
| GMSC | Gateway MSC |
| GPRS | General Packet Radio System |
| GLR | Gateway Location Register |
| GSM | Global System for Mobile |
| GSM SSF | GSM Service Switching Function |
| GT | Global Title |
| HLR-H | HLR from HPMN |
| HLR | Home Location Register |
| HPMN | Home Public Mobile Network |
| IMSI | International Mobile Subscriber Identity |
| ICV | Integrated Cellular VoIP |
| IN | Intelligent Network |
| ISG | International Signal Gateway |
| INAP | Intelligent Network Application Part |
| ISD | MAP Insert Subscriber Data |
| IAM | Initial Address Message |
| IDP | Initial DP IN/CAP message |
| ITR | Inbound Traffic Redirection |
| ISUP | ISDN User Part |
| LU | Location Update |
| LUP | MAP Location Update |
| MAP | Mobile Application Part |
| MCC | Mobile Country Code |
| MCC | Mobile Country Code |
| ME | Mobile Equipment |
| MNC | Mobile Network Code |
| MO | Mobile Originated |
| MSC | Mobile Switching Center |
| MSISDN | Mobile Subscriber ISDN Number |
| MSRN | Mobile Subscriber Roaming Number |
| MT | Mobile Terminated |
| MTP | Message Transfer Part |
| NP | Numbering Plan |
| NPI | Numbering Plan Indicator |
| NDC | National Dialing Code |
| ODB | Operator Determined Barring |
| OTA | Over The Air |
| O-CSI | Originating CAMEL Subscription Information |
| PRN | Provide Roaming Number |
| RNA | Roaming Not Allowed |
| RPD | Roamer Probe Database |
| RR | Roaming Restricted due to unsupported feature |
| RI | Routing Indicator |
| SPC | Signal Point Code |
| SRI | Send Routing Information |
| SCCP | Signal Connection Control part |
| STP | Signal Transfer Point |
| STP-H | HPMN STP |
| SRI-SM | Send Routing Information For Short Message |

APPENDIX-continued

| Acronym | Description |
|---|---|
| SSP | Service Switch Point |
| SSN | Sub System Number |
| SIM | Subscriber Identify Module |
| STK | SIM Tool Kit Application |
| SM-RP-UI | Short Message Relay Protocol User Information |
| STP | Signal Transfer Point |
| SS | Supplementary Services |
| TR | Traffic Redirection |
| T-CSI | Terminating CAMEL Service Information |
| TCAP | Transaction Capabilities Application Part |
| TP | SMS Transport Protocol |
| UDHI | User Data Header Indicator |
| UDH | User Data Header |
| UD | User Data |
| VAS | Value Added Service |
| VLR-V | VLR from VPMN |
| VoIP | Voice over Internet Protocol |
| VLR | Visited Location Register |
| VMSC | Visited Mobile Switching Center |
| WSP | Wireless Session Protocol |

Technical References (each of which is incorporated by reference in its entirety)

GSM 902 on MAP specification
Digital cellular telecommunications system (Phase 2+);
Mobile Application Part (MAP) Specification
(3GPP TS 09.02 version 7.9.0 Release 1998)
GSM 340 on SMS
Digital cellular telecommunications system (Phase 2+);
Technical realization of the Short Message Service (SMS);
(GSM 03.40 version 7.4.0 Release 1998)
GSM 378 on CAMEL
Digital cellular telecommunications system (Phase 2+);
Customized Applications for Mobile network Enhanced Logic (CAMEL) Phase 2;
Stage 2
(GSM 03.78 version 6.7.0 Release 1997)
GSM 978 on CAMEL Application protocol
Digital cellular telecommunications system (Phase 2+);
Customized Applications for Mobile network Enhanced Logic (CAMEL);
CAMEL Application Part (CAP) specification
(GSM 09.78 version 7.1.0 Release 1998)
Signalling procedures and the Mobile Application Part (MAP)
(Release 1999)
Q1214-Q1218 on Intelligent Networks
Q701-704 on SS7 MTP
Q711-Q714 on SS7 SCCP
Q760-Q769 on SS7 ISUP

I claim:

1. A method for mobile communications, the method comprising:
receiving, at a Home Public Mobile Network, a single subscription activation message from a subscriber at a Signaling Gateway (SG) having a SG address, the subscriber being associated with the Home Public Mobile Network (HPMN) and having a HPMN Subscriber Identity Module (SIM) with a corresponding HPMN International Mobile Subscriber Identity (IMSI) and a corresponding HPMN Mobile Station International Subscriber Directory Number (MSISDN);
assigning one or more MSISDNs to the subscriber based on the single subscription activation message, wherein each of the one or more MSISDNs is associated with one or more IMSIs stored in the SIM and corresponds to one or more Friendly Public Mobile Networks (FPMNs)

coupled to a Visited Location Register (VLR) and a Serving General packet radio service Support Node (SGSN), and wherein the subscription activation message is received from one of the one or more FPMNs;

maintaining, at the SG, a local profile of the subscriber corresponding to each IMSI activated in the SIM;

associating the one or more MSISDNs with the HPMN MSISDN to facilitate mobile communications corresponding to the one or more MSISDNs assigned to the subscriber;

receiving, at the SG, mobile communications originating at the HPMN, directed to the one or more FPMNs, wherein the mobile communications include a Signaling Connection and Control Part (SCCP) message;

registering the subscriber with one of the one or more FPMNs;

receiving a mobile communication from the subscriber, the mobile communication having a location address, wherein the location address is selected from a group consisting of a VLR address, a Visited Mobile Switching Center (VMSC) address, and a SGSN address;

replacing the location address with the SG address, wherein the SG address is associated with the HPMN; and issuing, at the SG, a cancel registration message to at least one selected from the group consisting of the VLR and the SGSN.

2. The method of claim 1, further comprising:

storing the association of the one or more MSISDNs with the HPMN MSISDN in a subscription a data repository accessible by the SG.

3. The method of claim 1, wherein the HPMN has a Home Location Register (HLR), the method further comprising:

issuing, at the SG, a routing query to the HPMN HLR for retrieving the HPMN IMSI corresponding to the subscriber.

4. The method of claim 1, wherein the subscription activation message is selected from a group consisting of a Short Message Service (SMS) message, an Unstructured Supplementary Service Data (USSD) message, a customer care call, a Wireless Application Protocol (WAP) interaction, a World Wide Web interaction, and an Interactive Voice Response (IVR) message.

5. The method of claim 1, wherein the subscription activation message is received from a Visited Public Mobile Network (VPMN).

6. The method of claim 1, the method further comprising:

registering the subscriber with one of the one or more FPMNs;

receiving a mobile communication from the subscriber, the mobile communication having a calling party address; and replacing the calling party address with the SG address, wherein the SG address is associated with the HPMN.

7. The method of claim 1, wherein the subscriber has a Customized Applications for Mobile networks Enhanced Logic (CAMEL) profile at the HPMN, the method further comprising:

facilitating receipt of the subscriber CAMEL profile at the SG;

wherein the subscriber is registered at one of the one or more FPMNs; and wherein the subscriber is a pre-paid subscriber.

8. The method of claim 1, wherein one of the one or more FPMNs has roaming partners and is a sponsor operator of the HPMN in providing indirect roaming relationships to the roaming partners.

9. The method of claim 1, wherein the HPMN has an associated first network technology, and at least one of the one or more FPMNs has an associated second network technology.

10. A computer program product comprising a non-transitory computer usable medium having control logic stored therein for causing a computer to perform mobile communications, the control logic comprising computer readable program code means for:

receiving, at a Home Public Mobile Network, a single subscription activation message from a subscriber at a Signaling Gateway (SG) having a SG address, the subscriber being associated with the Home Public Mobile Network (HPMN) and having a HPMN Subscriber Identity Module (SIM) with a corresponding HPMN International Mobile Subscriber Identity (IMSI) and a corresponding HPMN Mobile Station International Subscriber Directory Number (MSISDN);

assigning one or more MSISDNs to the subscriber based on the single subscription activation message, wherein each of the one or more MSISDNs is associated with one or more IMSIs stored in the SIM and corresponds to one or more Friendly Public Mobile Networks (FPMNs) coupled to a Visited Location Register (VLR) and a Serving General packet radio service Support Node (SGSN), and wherein the subscription activation message is received from one of the one or more FPMNs;

maintaining, at the SG, a local profile of the subscriber corresponding to each IMSI activated in the SIM;

associating the one or more MSISDNs with the HPMN MSISDN to facilitate mobile communications corresponding to the one or more MSISDNs assigned to the subscriber;

receiving, at the SG, mobile communications originating at the HPMN, directed to the one or more FPMNs, wherein the mobile communications include a Signaling Connection and Control Part (SCCP) message;

registering the subscriber with one of the one or more FPMNs;

receiving a mobile communication from the subscriber, the mobile communication having a location address, wherein the location address is selected from a group consisting of a VLR address, a Visited Mobile Switching Center (VMSC) address, and a SGSN address;

replacing the location address with the SG address, wherein the SG address is associated with the HPMN; and issuing, at the SG, a cancel registration message to at least one selected from the group consisting of the VLR and the SGSN.

11. The computer program product of claim 10, further comprising computer readable program code means for:

storing the association of the one or more MSISDNs with the HPMN MSISDN in a subscription a data repository accessible by the SG.

12. The computer program product of claim 10, wherein the HPMN has a Home Location Register (HLR), the control logic further comprising computer readable program code means for:

issuing, at the SG, a routing query to the HPMN HLR for retrieving the HPMN IMSI corresponding to the subscriber.

13. The computer program product of claim 10, wherein the subscription activation message is selected from a group consisting of a Short Message Service (SMS) message, an Unstructured Supplementary Service Data (USSD) message, a customer care call, a Wireless Application Protocol (WAP)

interaction, a World Wide Web interaction, and an Interactive Voice Response (IVR) message.

14. The computer program product of claim 10, wherein the subscription activation message is received from a Visited Public Mobile Network (VPMN).

15. The computer program product of claim 10, the computer program product further comprising computer readable program code means for:
   registering the subscriber with one of the one or more FPMNs;
   receiving a mobile communication from the subscriber, the mobile communication having a calling party address; and
   replacing the calling party address with the SG address, wherein the SG address is associated with the HPMN.

16. The computer program product of claim 10, wherein the subscriber has a Customized Applications for Mobile networks Enhanced Logic (CAMEL) profile at the HPMN, the computer program product further comprising computer readable program code means for:
   facilitating receipt of the subscriber CAMEL profile at the SG;
   wherein the subscriber is registered at one of the one or more FPMNs; and
   wherein the subscriber is a pre-paid subscriber.

17. A system for mobile communications, the system comprising:
   a module for receiving, at a Home Public Mobile Network, a single subscription activation message from a subscriber at a Signaling Gateway (SG) having a SG address, the subscriber being associated with the Home Public Mobile Network (HPMN) and having a HPMN Subscriber Identity Module (SIM) with a corresponding HPMN International Mobile Subscriber Identity (IMSI) and a corresponding HPMN Mobile Station International Subscriber Directory Number (MSISDN);
   a module for assigning one or more MSISDNs to the subscriber based on the single subscription activation message, wherein each of the one or more MSISDNs is associated with one or more IMSIs stored in the SIM and corresponds to one or more Friendly Public Mobile Networks (FPMNs) coupled to a Visited Location Register (VLR) and a Serving General packet radio service Support Node (SGSN), and wherein the subscription activation message is received from one of the one or more FPMNs;
   a module for maintaining, at the SG, a local profile of the subscriber corresponding to each IMSI activated in the SIM;
   a module for associating the one or more MSISDNs with the HPMN MSISDN to facilitate mobile communications corresponding to the one or more MSISDNs assigned to the subscriber;
   a module for receiving, at the SG, mobile communications originating at the HPMN, directed to the one or more FPMNs, wherein the mobile communications include a Signaling Connection and Control Part (SCCP) message;
   a module for registering the subscriber with one of the one or more FPMNs;
   a module for receiving a mobile communication from the subscriber, the mobile communication having a location address, wherein the location address is selected from a group consisting of a VLR address, a Visited Mobile Switching Center (VMSC) address, and a SGSN address;
   a module for replacing the location address with the SG address, wherein the SG address is associated with the HPMN; and
   a module for issuing, at the SG, a cancel registration message to at least one selected from the group consisting of the VLR and the SGSN.

18. The system of claim 17, further comprising:
   a module for storing the association of the one or more MSISDNs with the HPMN MSISDN in a subscription a data repository accessible by the SG.

19. The system of claim 17, wherein the HPMN has a Home Location Register (HLR), the system further comprising:
   a module for issuing, at the SG, a routing query to the HPMN HLR for retrieving the HPMN IMSI corresponding to the subscriber.

20. The system of claim 17, wherein the subscription activation message is selected from a group consisting of a Short Message Service (SMS) message, an Unstructured Supplementary Service Data (USSD) message, a customer care call, a Wireless Application Protocol (WAP) interaction, a World Wide Web interaction, and an Interactive Voice Response (IVR) message.

21. The system of claim 17, wherein the subscription activation message is received from a Visited Public Mobile Network (VPMN).

22. The system of claim 17, the system further comprising:
   a module for registering the subscriber with one of the one or more FPMNs;
   a module for receiving a mobile communication from the subscriber, the mobile communication having a calling party address; and
   a module for replacing the calling party address with the SG address, wherein the SG address is associated with the HPMN.

23. The system of claim 17, wherein the subscriber has a Customized Applications for Mobile networks Enhanced Logic (CAMEL) profile at the HPMN, the system further comprising:
   a module for facilitating receipt of the subscriber CAMEL profile at the SG;
   wherein the subscriber is registered at one of the one or more FPMNs; and
   wherein the subscriber is a pre-paid subscriber.

24. A method for mobile communications for a subscriber roaming in a Visited Public Mobile (VPMN) Network, the method comprising:
   receiving, at a Home Public Mobile Network, a single subscription activation message from a subscriber at a Signaling Gateway (SG) having a SG address, the subscriber being associated with the Home Public Mobile Network (HPMN) and having a HPMN Subscriber Identity Module (SIM) with a corresponding HPMN International Mobile Subscriber Identity (IMSI) and a corresponding HPMN Mobile Station International Subscriber Directory Number (MSISDN);
   assigning one or more MSISDNs to the subscriber based on the single subscription activation message, wherein each of the one or more MSISDNs is associated with one or more IMSIs stored in the SIM and corresponds to one or more Friendly Public Mobile Networks (FPMNs) coupled to a Visited Location Register (VLR) and a Serving General packet radio service Support Node (SGSN), and wherein the subscription activation message is received from one of the one or more FPMNs;

maintaining, at the SG, a local profile of the subscriber corresponding to each IMSI activated in the SIM;

associating the one or more MSISDNs with the HPMN MSISDN to facilitate mobile communications corresponding to the one or more MSISDNs assigned to the subscriber;

receiving, at the SG, mobile communications originating at the HPMN, directed to the one or more FPMNs, wherein the mobile communications include a Signaling Connection and Control Part (SCCP) message;

registering the subscriber with one of the one or more FPMNs;

receiving a mobile communication from the subscriber, the mobile communication having a location address, wherein the location address is selected from a group consisting of a VLR address, a Visited Mobile Switching Center (VMSC) address, and a SGSN address;

replacing the location address with the SG address, wherein the SG address is associated with the HPMN; and issuing, at the SG, a cancel registration message to at least one selected from the group consisting of the VLR and the SGSN;

wherein the HPMN has a roaming relationship with the VPMN.

* * * * *